United States Patent
Fujisawa et al.

(10) Patent No.: US 9,626,094 B2
(45) Date of Patent: Apr. 18, 2017

(54) COMMUNICATION DEVICE AND ELECTRONIC DEVICE

(75) Inventors: Eizou Fujisawa, Yokohama (JP); Yuuya Ozaki, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 187 days.

(21) Appl. No.: 13/380,691

(22) PCT Filed: Jun. 25, 2010

(86) PCT No.: PCT/JP2010/060902
§ 371 (c)(1),
(2), (4) Date: Dec. 23, 2011

(87) PCT Pub. No.: WO2010/150893
PCT Pub. Date: Dec. 29, 2010

(65) Prior Publication Data
US 2012/0098780 A1    Apr. 26, 2012

(30) Foreign Application Priority Data

Jun. 26, 2009 (JP) ................................ 2009-151722
Jul. 29, 2009 (JP) ................................ 2009-177078
Jul. 29, 2009 (JP) ................................ 2009-177094

(51) Int. Cl.
*G06F 3/0488* (2013.01)
*G06F 17/30* (2006.01)

(52) U.S. Cl.
CPC ...... *G06F 3/0488* (2013.01); *G06F 17/30038* (2013.01); *G06F 17/30061* (2013.01);
(Continued)

(58) Field of Classification Search
None
See application file for complete search history.

(56) References Cited

U.S. PATENT DOCUMENTS 5,734,905 A * 3/1998 Oppenheim ................. 719/315
2008/0229222 A1* 9/2008 Kake ............................ 715/764
(Continued)

FOREIGN PATENT DOCUMENTS

JP    2003233626 A    8/2003
JP    3890880 B2      3/2007
(Continued)

OTHER PUBLICATIONS

International Search Report and Written Opinion for PCT/JP2010/060902 dated Aug. 10, 2010.
(Continued)

*Primary Examiner* — Nicholas Lee
*Assistant Examiner* — Duane N Taylor, Jr.
(74) *Attorney, Agent, or Firm* — Hauptman Ham, LLP

(57) ABSTRACT

An electronic device or a communication device including a display unit for displaying an image, an input detector for detecting an input instruction input by touching an area where the image is displayed by the display unit, and a control unit for providing control based on the input instruction detected by the input detector and for providing control for an image to be displayed on the display unit. When the display unit displays a pre-extraction group object containing a plurality of item objects on its screen, and when the input detector detects an input of a predetermined instruction to refine the pre-extraction group object, the control unit extracts a group of item objects that match a refinement criterion in the input instruction, and displays the group as a post-extraction group object on the screen of the display unit.

17 Claims, 28 Drawing Sheets

(52) U.S. Cl.
CPC .. *G06F 17/30274* (2013.01); *G06F 17/30277* (2013.01); *H04M 2250/22* (2013.01)

(56) References Cited

U.S. PATENT DOCUMENTS

2009/0228820 A1* 9/2009 Kim et al. .................. 715/769
2009/0292989 A1* 11/2009 Matthews et al. ............ 715/702
2011/0116769 A1   5/2011 Sugiyama et al.

FOREIGN PATENT DOCUMENTS

JP   2008097175 A   4/2008
WO   2009020103 A1   2/2009

OTHER PUBLICATIONS

Extended European Search Report in EP Application No. 10792211.4 dated Apr. 11, 2016.
Ji Soo Yi et al, "Dust & Magnet: multivariate information visualization using a magnet metaphor", Information Visualization, vol. 4, No. 4, Jun. 23, 2005, pp. 239-256, Palgrave MacMillan Ltd.

* cited by examiner

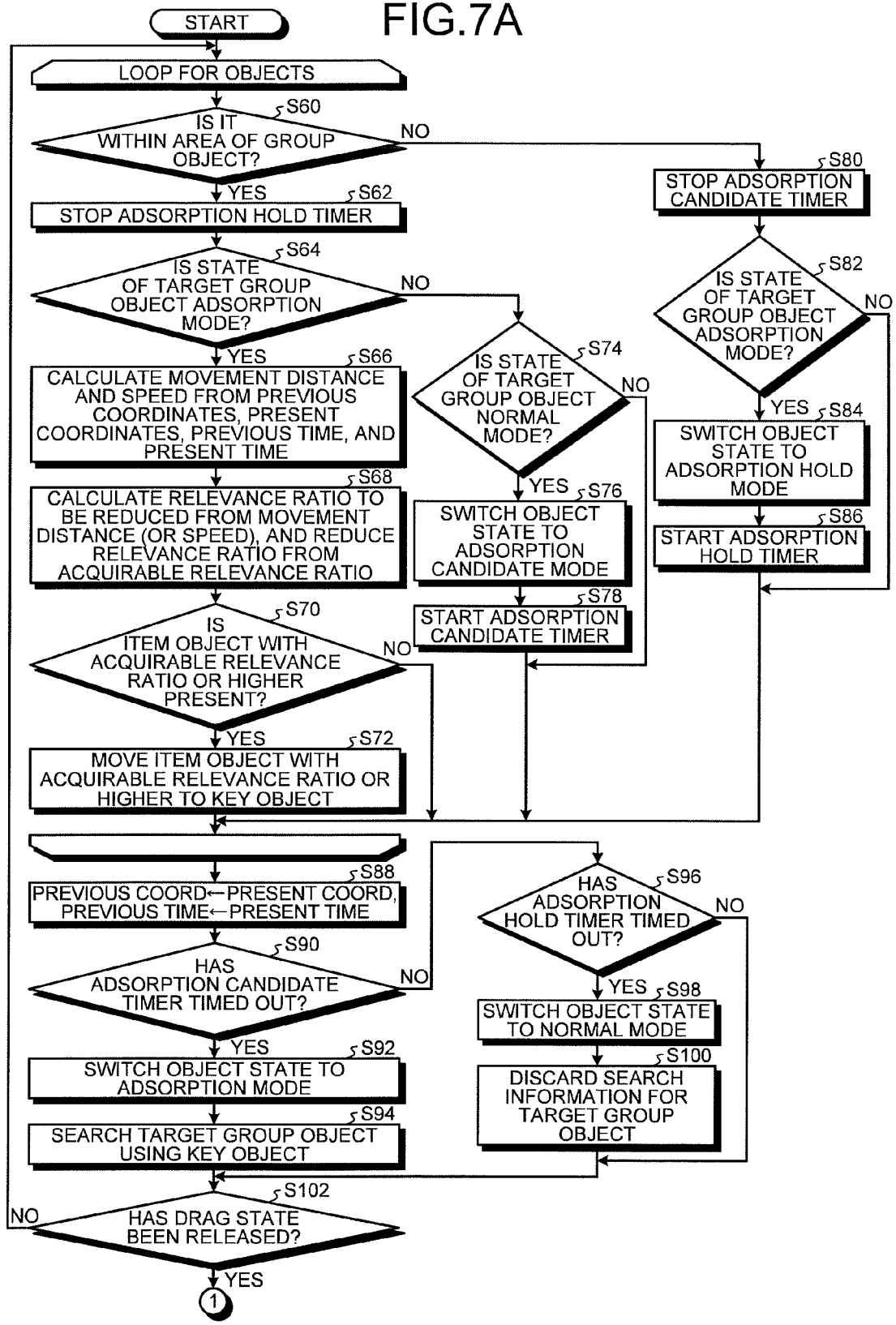

COMMUNICATION DEVICE AND ELECTRONIC DEVICE

CROSS-REFERENCE TO RELATED APPLICATION

This application is a National Stage of PCT international application Ser. No. PCT/JP2010/060902 filed on Jun. 25, 2010 which is based upon and claims the benefit of priority from Japanese Patent Application No. 2009-151722 filed on Jun. 26, 2009, Japanese Patent Application No. 2009-177078 filed on Jul. 29, 2009, and Japanese Patent Application No. 2009-177094 filed on Jul. 29, 2009.

FIELD

The present invention relates to a communication device and an electronic device for selecting an object based on an input to an area where an image is displayed by a display unit.

BACKGROUND

In electronic devices such as mobile phones, various input devices are provided as a device for inputting an instruction of an operator, besides a keyboard, a numeric keypad, and an input device having buttons to be pressed. For example, Patent Literature 1 discloses a mobile terminal for detecting, as an input, an inclined angle of the mobile terminal and a gesture such as "shaking" and "inclining" from a signal obtained from an acceleration sensor. The device described in Patent Literature 1 is configured to control a movement of an icon group representing information contents from the inclined angle of the mobile terminal and to display momentarily moving icons on a display.

CITATION LIST

Patent Literature

Patent Literature 1: Japanese Patent Application Laid-open No. 2002-149616

Technical Field

As the input device, there is a touch panel or the like in which an image displayed area is touched by an operator and the touch is detected as an input. The touch panel allows the operator to perform operations to a screen while directly touching the screen. Thus the touch panel enables intuitive operation and therefore high operability to be achieved.

In the electronic device, especially, in the communication device, when information is acquired through the Internet, or when some files are extracted from one folder, search refinement is sometimes performed. Such search refinement is implemented by checking search criteria as keys against information for each of the files and extracting a file that satisfies the search criteria. As a display method of the file extracted by the search refinement, there is a method of determining also a relevance ratio with the search criteria and displaying extracted files in descending order of the relevance ratio. By displaying the result of search refinement in descending order of the relevance ratio in the above manner, checking can be performed from the file more closely matching the search criteria input by the operator.

However, in this method, if the relevance ratio is set to a certain value, how many files to be extracted as a result of refinement is not known until the result of search is displayed. Meanwhile, if the number of files to be extracted is set, the level of extracted relevance ratio may change depending on the search criteria. Therefore, the search is repeated while setting various criteria, and this makes it difficult to improve the operability.

It is desirable to also improve the operability for handling a file group as a target of search refinement after the search refinement is performed on the file group as the target of the search refinement.

If the results of logical operations performed on a plurality of search keys are used as search criteria, it is difficult to easily perform the search refinement.

For the foregoing reasons, there is a need for a communication device and an electronic device capable of performing search refinement with higher operability.

SUMMARY OF THE INVENTION

According to an aspect, a communication device includes a display unit for displaying an image, an input detector for detecting an input instruction input by touching an area where the image is displayed by the display unit, a communication unit for performing communication with another terminal, and a control unit for providing control based on the input instruction detected by the input detector and for providing control for an image to be displayed on the display unit. When a pre-extraction group object containing a plurality of destination specifying objects each associated with address information used for communication performed through the communication unit is displayed on a screen by the display unit, and when the input detector detects an input of a predetermined instruction to refine the pre-extraction group object, the control unit extracts a group of destination specifying objects that match a refinement criterion in the input instruction, displays the group as a post-extraction group object on the screen of the display unit, and causes, when the input detector detects an input of an instruction for selecting and deciding one of the destination specifying objects in the post-extraction group object, the communication unit to start communication based on the address information associated with the selected destination specifying object.

According to another aspect, when a group object containing a plurality of destination specifying objects being address information used for communication performed through the communication unit and a key object being a criterion for refining the destination specifying objects from the group object are displayed on the screen by the display unit, and when the input detector detects a touch on the key object and a movement instruction thereof in the touched state, the control unit calculates a relevance ratio of each of the destination specifying objects in the group object to the key object, detects a movement amount of the key object using the input detector, calculates a range of the relevance ratio of a destination specifying object to be extracted based on the movement amount of the key object, extracts destination specifying objects that satisfy the calculated range of the relevance ratio from among the destination specifying objects in the group object, and causes, when the input detector detects an input of an instruction for selecting and deciding one of the extracted destination specifying objects, the communication unit to start communication based on the address information associated with the selected destination specifying object.

According to another aspect, when a group object containing a plurality of destination specifying objects being address information used for communication performed through the communication unit, a key object in which a criterion for refining the destination specifying objects from the group object is abstracted, and a key box object capable of containing a plurality of the key objects are displayed on the screen by the display unit, and when the input detector detects a touch on the key box object and a movement instruction thereof in a touched state, the control unit determines a result of logical operation performed on the key object contained in the key box object, calculates a relevance ratio of each of the destination specifying objects in the group object to the result of the logical operation, extracts destination specifying objects that satisfy a range of the calculated relevance ratio from among the destination specifying objects in the group object, displays the extracted destination specifying objects on the screen of the display unit, and causes, when the input detector detects an input of an instruction for selecting and deciding one of the extracted destination specifying objects, the communication unit to start communication based on the address information associated with the selected destination specifying object.

According to another aspect, when the input detector detects a touch on the post-extraction group object and a movement instruction thereof in the touched state, the control unit provides control so that a movement direction of the post-extraction group object is detected by the input detector and whether extracted destination specifying objects are kept contained in the pre-extraction group object is determined based on the movement direction of the post-extraction group object.

According to another aspect, when the pre-extraction group object and a key object in which a criterion for refining the destination specifying objects from the pre-extraction group object is abstracted are displayed on the screen by the display unit, and when the input detector detects a touch on the key object and a movement instruction thereof in a touched state, the control unit calculates a relevance ratio of each of the destination specifying objects in the pre-extraction group object to the key object, and extracts a destination specifying object that satisfies a range of the calculated relevance ratio from among the destination specifying objects in the pre-extraction group object.

According to another aspect, a n electronic device includes a display unit for displaying an image, an input detector for detecting an input instruction input by touching an area where the image is displayed by the display unit, and a control unit for providing control based on the input instruction detected by the input detector and for providing control for an image to be displayed on the display unit. When a pre-extraction group object containing a plurality of item objects is displayed on a screen by the display unit, and when the input detector detects an input of a predetermined instruction to refine the pre-extraction group object, the control unit extracts a group of item objects that match a refinement criterion in the input instruction, and displays the group as a post-extraction group object on the screen of the display unit.

According to another aspect, when a group object containing a plurality of item objects and a key object being a criterion for refining the item objects from the group object are displayed on the screen by the display unit, and when the input detector detects a touch on the key object and a movement instruction thereof in the touched state, the control unit calculates a relevance ratio of each of the item objects in the group object to the key object, causes the input detector to detect a movement amount of the key object, calculates a range of the relevance ratio of an item object to be extracted based on the movement amount of the key object, and extracts an item object that satisfies the calculated range of the relevance ratio from among the item objects in the group object.

According to another aspect, when a group object containing a plurality of item objects, a key object in which a criterion for refining the item objects from the group object is abstracted, and a key box object capable of containing a plurality of the key objects are displayed on the screen by the display unit, and when the input detector detects a touch on the key box object and a movement instruction thereof in a touched state, the control unit determines a result of logical operation performed on the key object contained in the key box object, calculates a relevance ratio of each of the item objects in the group object to the result of the logical operation, extracts an item object that satisfies a range of the calculated relevance ratio from among the item objects in the group object, and displays the extracted item object on the screen of the display unit.

According to another aspect, when the input detector detects a predetermined first input operation to the key box object, the control unit provides control so that setting of logical operation to be performed on the key objects contained in the key box object is changed from a currently set operation expression to any other operation expression.

According to another aspect, when the input detector detects a predetermined second input operation to the key box object, the control unit provides control so as to cause the display unit to display the key objects contained in the key box object on the screen, and to delete, when it is detected that any one of the displayed key objects is selected, the selected key object from the key box object.

According to another aspect, when the key object is displayed on the screen by the display unit, and when the input detector detects movement of the key object into a display area of the key box object, the control unit provides control so as to contain the key object in the key box object.

According to another aspect, the control unit provides control so that the input detector detects a movement amount of the key box object, and a range of the relevance ratio of an item object to be extracted is calculated based on the movement amount of the key box object.

According to another aspect, the control unit sets a group of extracted item objects as a new group object.

According to another aspect, the control unit causes the display unit to display the item objects contained in the group object, and to display the extracted item objects near the key object.

According to another aspect, the control unit fluctuates a range of the relevance ratio to be calculated according to a distance between the key object and the group object, extracts an item object including an item object with a lower relevance ratio as the distance is smaller, and extracts only an item object with a higher relevance ratio as the distance is larger.

According to another aspect, the control unit calculates a range of the relevance ratio of an item object to be extracted according to a movement distance of the key object within a display area of the group object, extracts an item object including an item object with a lower relevance ratio as the movement distance is longer, and extracts only an item object with a higher relevance ratio as the movement distance is shorter.

According to another aspect, when the key object is selected and an item object is extracted based on the range of the relevance ratio at the time of the selection, and when the input detector detects a tap on the key object, the control unit makes the range of the relevance ratio of the item object to be extracted narrower than that before the tap occurs.

According to another aspect, the control unit makes the range of the relevance ratio of the item object to be extracted narrower with a longer tapping time.

According to another aspect, the control unit makes the range of the relevance ratio of the item object to be extracted narrower with a larger number of tapping times.

According to another aspect, the control unit does not extract the item object in a period from entering of the key object into the display area of the group object to elapse of a preset time.

According to another aspect, when a pre-extraction group object containing a plurality of item objects is displayed on the screen by the display unit, and when the input detector detects the input of a predetermined instruction to refine the pre-extraction group object, the control unit provides control so as to extract a group of item objects that match a refinement criterion in the input instruction, display the group as a post-extraction group object on the screen of the display unit, to cause, when the input detector detects a touch on the post-extraction group object and a movement instruction thereof in a touched state, the input detector to detect a movement direction of the post-extraction group object, and to determine whether the extracted item object is kept contained in the pre-extraction group object based on the movement direction of the post-extraction group object.

According to another aspect, when the pre-extraction group object and a key object in which a criterion for refining the item objects from the pre-extraction group object is abstracted are displayed on the screen by the display unit, and when the input detector detects a touch on the key object and a movement instruction thereof in a touched state, the control unit calculates a relevance ratio of each of the item objects in the pre-extraction group object to the key object, and extracts an item object that satisfies a range of the calculated relevance ratio from among the item objects in the pre-extraction group object.

According to another aspect, when the input detector detects that the post-extraction group object is moved into a display area of the pre-extraction group object and then it is moved to outside of the display area of the pre-extraction group object, the control unit provides control so as to contain the extracted item object in both the pre-extraction group object and the post-extraction group object.

According to another aspect, when the input detector detects that the post-extraction group object is moved in a direction away from the display area of the pre-extraction group object without movement of the post-extraction group object into the display area of the pre-extraction group object, the control unit provides control so as to contain the extracted item object only in the post-extraction group object and delete the extracted item object from the pre-extraction group object.

According to another aspect, the control unit causes the input detector to detect a movement amount of the key object upon extraction of the post-extraction group object, and calculates the range of the relevance ratio of an item object to be extracted based on the movement amount of the key object.

According to another aspect, the control unit causes the display unit to display the item object contained in the pre-extraction group object, and to display the item object together with the post-extraction group object near the key object.

According to another aspect, the control unit fluctuates a range of relevance ratio to be calculated according to a distance between the key object and the pre-extraction group object upon extraction of the post-extraction group object, extracts an item object including an item object with a lower relevance ratio as the distance is smaller, and extracts only an item object with a higher relevance ratio as the distance is larger.

According to another aspect, the control unit causes the display unit to display a group object with a larger number of the item objects contained therein in a larger size, and to display a group object with a smaller number of the item objects contained therein in a smaller size.

According to another aspect, the control unit causes the display unit to display the group object with an outline drawn along its outer periphery.

According to another aspect, the input detector is a touch sensor placed on a front face of the display unit, and detects a force loaded to the display unit as an input, and the control unit determines which key object is operated by associating the position where the load is input with the image displayed on the display unit.

Advantageous Effects of Invention

The electronic device and the communication device according to the present invention have such advantageous effects that search refinement can be performed with high operability.

BRIEF DESCRIPTION OF DRAWINGS

FIG. 7A is a flowchart illustrating one example of the processing operation of the mobile electronic communication device.

DESCRIPTION OF EMBODIMENTS

Embodiments of the present invention will be explained in detail below with reference to the drawings.

It should be noted that the present invention is not limited by the following explanation. In addition, the components in the explanation below include those which are easily thought of by persons skilled in the art, those substantially equivalents, and those in a scope of so-called equivalents. In the following, a mobile electronic communication device, more specifically, a mobile phone is used to explain as an example of the communication device and the electronic device, however, the present invention is not limited to the mobile phones. The communication device and the electronic device can also be applied to, for example, PHSs (Personal Handy phone Systems), PDAs, portable and car-mounted navigation devices, portable personal computers, gaming devices, etc.

Figure 1:
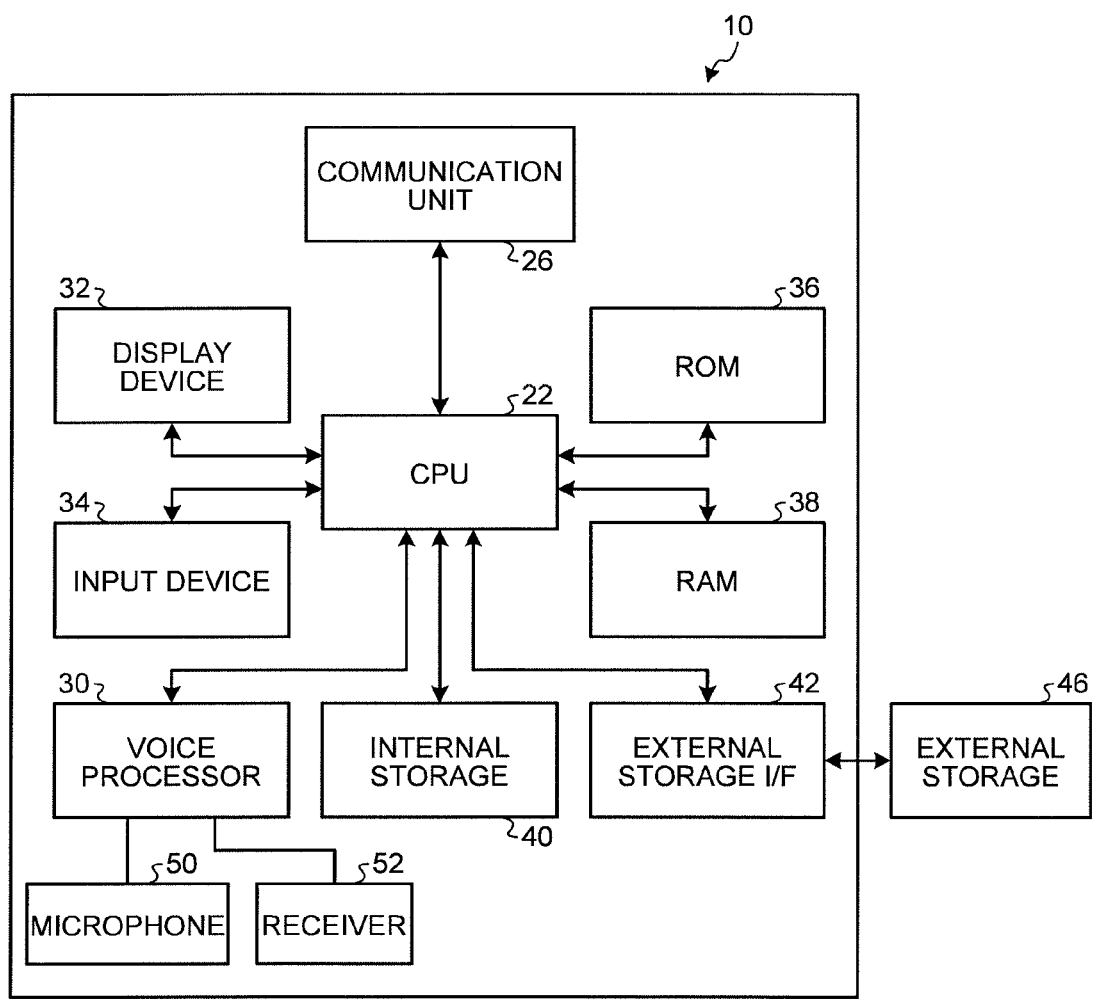
FIG. 1 is a block diagram illustrating a schematic configuration of a mobile electronic communication device according to one embodiment of a communication device and an electronic device.

FIG. 1 is a block diagram illustrating a schematic configuration of a mobile electronic communication device according to one embodiment of a communication device and an electronic device. As illustrated in FIG. 1, a mobile electronic communication device 10 basically includes a CPU (Central Processing Unit) 22, a communication unit 26, a voice processor 30, a display device 32, an input device 34, ROM 36, RAM 38, an internal storage 40, and an external storage interface (I/F) 42. The mobile electronic communication device 10 is connected to an external storage 46 via the external storage I/F 42. The mobile electronic communication device 10 also includes, in addition to the components, various components such as an imaging unit, various terminals, and the like provided in mobile electronic communication devices. An outer shape of the mobile electronic communication device 10 includes various shapes such as a foldable shape configured with two members coupled to each other by a hinge, a shape in which two members are slid each other, and a one box shape.

The CPU 22 is a processing unit that integrally controls the entire operation of the mobile electronic communication device 10. That is, the CPU 22 executes various processes of the mobile electronic communication device 10 in an appropriate procedure according to the operation of the input device 34 and the software stored in the ROM 36 and the internal storage 40 of the mobile electronic communication device 10, to control the operations of the communication unit 26, the display device 32, and the like. The various processes of the mobile electronic communication device 10 include, for example, voice phone conversation over a line switching network, creation and transmission/reception of electronic mail, and browsing of Web (World Wide Web) sites on the Internet. The operation of the communication unit 26 includes, for example, transmission/reception of signals. The operation of the voice processor 30 includes, for example, voice input/output. The operation of the display device 32 is image display.

The CPU 22 executes the processes based on programs (for example, operating system programs and application programs) stored in the ROM 36 and/or the internal storage 40. The CPU 22 is formed with, for example, MPU (Micro Processing Unit) and executes the various processes of the mobile electronic communication device 10 according to the procedure instructed by the software. That is, the CPU 22 sequentially reads operation codes from the operating system programs and the application programs or the like stored in the ROM 36 and the internal storage 40 to perform the processes.

The CPU 22 has a function of executing a plurality of application programs. The application program executed by the CPU 22 includes a plurality of application programs such as an image-display application program for displaying an image on the display device 32, an operation-detection application program for calculating the operation input based on the input detected by the input device 34, a search application program for performing search refinement, an Internet application program for performing Internet communication, a mail application program for creating mail, and a phone application program for making a phone call.

The communication unit 26 establishes a wireless signal path using CDMA system or so with a base station via a channel allocated by the base station, and performs telephone communication and information communication with the base station.

The voice processor 30 executes processes of a voice signal input to the microphone 50 and a voice signal output from the receiver 52. That is, the voice processor 30 amplifies the voice input through the microphone 50, subjects the voice to AD conversion (Analog-to-Digital conversion), thereafter, subjects the voice to signal processing such as encoding, converts the voice to digital voice data, and outputs the converted voice data to the CPU 22. The voice processor 30 subjects the voice data sent from the CPU 22 to processes such as decoding, DA conversion (Digital-to-Analog conversion), and amplification, converts the voice signal to an analog voice signal, and then outputs the converted voice signal to the receiver 52.

The display device 32 is provided with a display panel such as LCD (Liquid Crystal Display) or an organic EL (Organic Electro-Luminescence) panel, and displays a video according to video data and an image according to image data supplied from the CPU 22 on the display panel.

The input device 34 is a touch panel placed on the front face of the display device 32, and, when the operator touches the surface thereof, detects the touch as an input. The input device 34 detects a touched position, the strength of the touch, and so on. As the touch panel, there can be used touch panels of various types such as a matrix switch, a resistive type, a surface acoustic wave type, an infrared type, an electromagnetic induction type, and a capacitive type. When a key image allocated with each of various types of functions such as a power key, a talk key, numeric keys, character keys, direction keys, a decision key, a send key is displayed on the display device 32, and if the input device 34 is pressed by the operator, the input device 34 detects a pressed position (touched position). The CPU 22 of the mobile electronic communication device 10 determines that a key operation corresponding to the position where the input device 34 detects the touch is input, and performs a corresponding process.

The ROM (Read Only Memory) 36 is read-only storage device which stores therein a firmware such as BIOS used for the drive of the mobile electronic communication device 10. The RAM (Random Access Memory) 38 is a readable/writable storage device, which is formed with, for example, SRAM (Static Random Access Memory) and/or DRAM (Dynamic Random Access Memory), etc. The mobile electronic communication device 10 has a main storage device formed with the ROM 36 and the RAM 38. The ROM 36 and/or the RAM 38 is allocated with a computer program or temporary data used in the processing process of the software by the CPU 22, and temporarily stores the allocated data in a work area thereof.

The internal storage (internal memory) 40 is a readable and writable storage device, for example, a hard disk provided in the mobile electronic communication device 10. The internal storage 40 is used as an auxiliary storage device, which stores therein software and data used for processes performed by the CPU 22. The internal storage 40 includes, in addition to the tasks, an image folder for storing therein image data obtained through communication or downloaded, and a standby image folder, and a like, for storing therein an image file used for a standby image. The internal storage 40 also stores therein, in addition to these data, for example, sound data obtained through communication or downloaded, software used by the CPU 22 for controlling the internal storage 40, address book for storing and managing telephone numbers of the other parties on the phone and mail addresses and so on, a sound file such as a dial tone and a ring tone, and temporary data used in the processing process of the software.

The external storage I/F 42 is a terminal connected to the external storage 46 that is detachably provided. By connecting the external storage I/F 42 and the external storage 46, data transmission/reception can be performed between the CPU 22 and the external storage 46. The external storage (external memory) 46 is a storage device detachably attached to the mobile electronic communication device 10 through the external storage I/F 42, and may be formed as a memory card such as an SD card (registered trademark) and CompactFlash (registered trademark), as a detachable HDD (Hard Disk Drive). As a combination of the external storage I/F 42 and the external storage 46, a removable disk drive may be combined with a removable disk.

Figure 2:
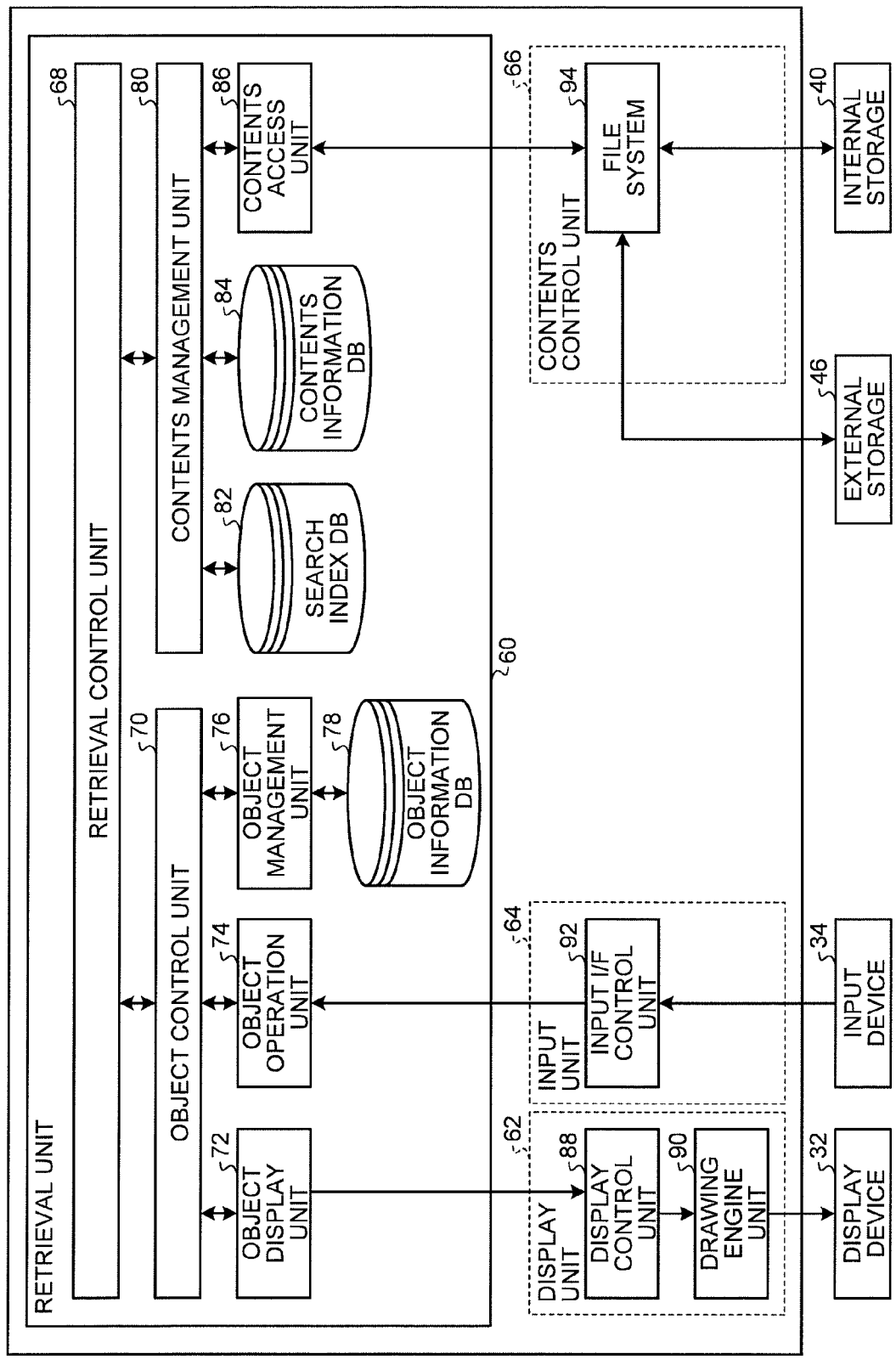
FIG. 2 is a block diagram illustrating a schematic configuration of software of the mobile electronic communication device in FIG. 1.
Figure 3:
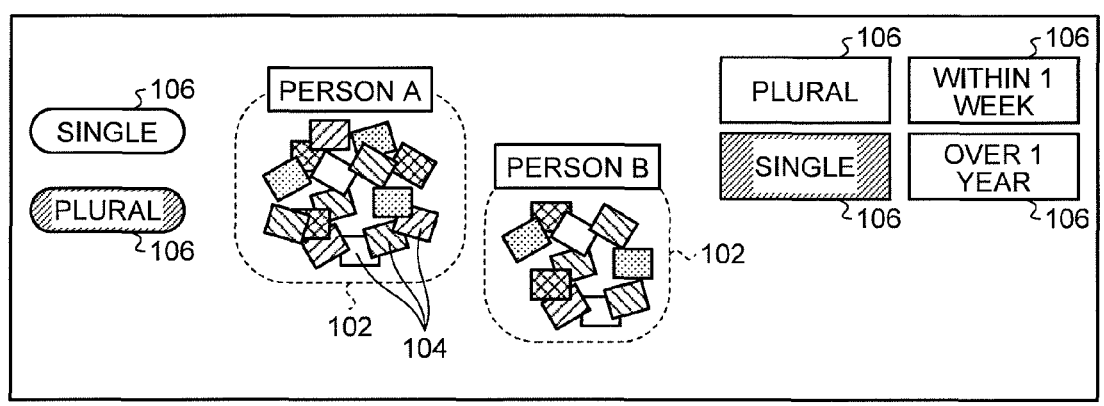
FIG. 3 is an explanatory diagram illustrating one example of an image displayed on a display device.

Next, the configuration of software of the mobile electronic communication device 10 will be explained below with reference to FIG. 2. FIG. 2 is a block diagram illustrating a schematic configuration of software of the mobile electronic communication device, and FIG. 3 is an explanatory diagram illustrating one example of an image displayed on the display device. FIG. 2 represents as if units of software (application programs) are discretely provided for explanation, however, signal exchange and data processing are performed between the CPU 22, the ROM 36, the RAM 38, and the internal storage 40, and the like, which does not mean that the units are separately provided in a visual manner. In addition, FIG. 2 represents, as the software, software related to search refinement of item objects and image display, however, the mobile electronic communication device 10 is provided with various types of software other than the software illustrated in FIG. 2. The object mentioned here represents an item as a target to be operated by the operator, and is a group object (folder), an item object (file), a key object (search criteria), or the like. The folder (directory) represents not only a folder created by the operator but also a folder created by the mobile electronic communication device 10 by search refinement and a folder temporarily created to manage a group of files detected by search refinement. As a file, image data, sound data, data on internet home pages, and address book for storing telephone numbers and mail addresses with their names, and a like are exemplified. As search criteria, characters as a keyword, a numerical value set as a threshold (time and date, size, and the number of persons in a case of an image), and a category of files (e.g., a landscape and a people photograph in the case of an image, and classic, hip hop, rock, or the like in the case of music) and so on.

The units displayed on the screen when search refinement is performed will be explained below with reference to FIG. 3. FIG. 3 is an explanatory diagram illustrating one example of an image displayed on the display device. As illustrated in FIG. 3, the display device 32 displays group objects 102 each containing a plurality of item objects 104, and key objects 106 used as search criteria. In the example illustrated in FIG. 3, the group object 102 is a folder that stores the item objects 104, and a group object named as "Person A" and a group object named as "Person B" are displayed thereon. As for each of the group objects 102, the outer periphery (outline) of a display area of the group object is surrounded by a solid line (indicated by a dotted line in the drawing). In other words, a boundary between the group object and the other portion, that is, an outline of the group object is displayed. Displayed inside of the group object 102 are item objects 104 belonging to the group object 102.

The item object 104 is formed with an image file, and thumbnail images of image files are displayed as the item objects 104 on the display device 32. Described in the key object 106 is wording used as a refinement criterion, and the key object 106 is displayed at a location separated by a certain distance or more from the group object 102. A method of operating an image displayed on the display device 32 and a method of controlling search refinement based on the operation will be explained later.

As illustrated in FIG. 2, the software of the mobile electronic communication device 10 includes a retrieval unit 60 for performing search refinement, a display unit 62 for controlling an image to be displayed on the display device 32, an input unit 64 for detecting an input to the input device 34, and a contents control unit 66 for transmitting/receiving data to/from the internal storage 40 and the external storage 46. The configuration of each of the units will be explained below.

The retrieval unit 60 includes a retrieval control unit 68, an object control unit 70, an object display unit 72, an object operation unit 74, an object management unit 76, an object information database 78, a contents management unit 80, a search index database 82, a contents information database 84, and a contents access unit 86. The retrieval unit 60 reads a group object with a plurality of collected item objects, calculates a relevance ratio between each of the item objects in the group object and search criteria, and performs search refinement. Specifically, the retrieval unit 60 retrieves item object(s) whose relevance ratio satisfies the criteria from the item objects in the group object. That is, the retrieval unit 60 extracts item object(s) whose relevance ratio falls within a predetermined range, to thereby perform search refinement. In the present embodiment, the retrieval unit 60 begins to extract item object(s) in descending order of the relevance ratio, and extracts item object(s) whose relevance ratio is determined to be included in a range from 100% to a determined percentage. A method of determining a range of relevance ratio to be extracted will be explained later.

The retrieval control unit 68 exchanges information between the object control unit 70 and the contents management unit 80, and performs search refinement of the item object based on the information supplied from each of the units. The object control unit 70 exchanges information with the object display unit 72, the object operation unit 74, and the object management unit 76, to control each behavior of various objects such as the group object, the item object, and the key object. Specifically, the object control unit 70 performs selection of a displayed object, determination of a location where the object is displayed, creation of a new group object based on the determination of the retrieval control unit 68, determination and movement of a group object to which each of the item objects belongs, and creation of a key object, and so on.

The object display unit 72 sends information for a displayed object that is determined based on the control by the object control unit 70 to a display control unit 88 of the display unit 62. That is, the object display unit 72 sends information as to which group object, which item object, and which key object are to be displayed, and information as to in which location and how each of the objects is displayed, to the display control unit 88.

The object operation unit 74 determines an object to be operated and an operation of the object based on the input signal sent from the input unit 64, and sends a signal of the object as the determined operation target and a signal of the determined operation to the object control unit 70.

The object management unit 76 includes a function of managing the objects, and the object information database 78 is a storage means storing therein information for each of the objects. As the information for each of the objects, various pieces of information, such as information indicating which group object the object belongs to, information for calculating a relevance ratio of an object upon search refinement, and information for a key object, required for search refinement and an operation of each of the objects are stored therein. The object information database 78 stores therein information for the objects displayed on the screen of the display device 32. When information is read from the object information database 78 as necessary and the information is sent to the object control unit 70, or when the information for the object is updated, the object management unit 76 updates the information stored in the object information database 78.

The contents management unit 80 includes the search index database 82, the contents information database 84, and the contents access unit 86. The contents management unit 80 reads a file such as photograph data, music data, and data of the address book stored in the internal storage 40 or the external storage 46 via the contents control unit 66, and writes each of the files to the internal storage 40 or the external storage 46.

The search index database 82 stores therein information for the search criteria used for search refinement. The search index database 82 also stores therein, as necessary, information for search criteria other than the information for the search criteria displayed as key objects on the screen of the display device 32.

The contents information database 84 stores therein sound data, image files, data for Internet sites, and the like being item objects. That is, the contents information database 84 stores therein information (sound information and/or image information) for files corresponding to the item objects displayed on the screen. The contents information database 84 also stores therein, as necessary, information for files of item objects other than the item objects displayed on the display device 32. The contents access unit 86 exchanges information with the contents control unit 66, reads file information acquired by the contents control unit 66 and software information or the like, and sends the file information sent from the contents management unit 80 and the software information to the contents control unit 66.

The display unit 62 includes the display control unit 88 and a drawing engine unit 90, generates an image signal of an image displayed on the display device 32 based on the information sent from the object display unit 72 of the retrieval unit 60, and sends the generated image signal to the display device 32. The display control unit 88 creates an image to be displayed based on the information sent from the object display unit 72, that is, based on the information as to which object is displayed at which location and how the object is displayed. The drawing engine unit 90 converts the image created by the display control unit 88 to an image signal and sends the converted image signal to the display device 32. The display device 32 displays the image created by the display unit 62 based on the information sent from the retrieval unit 60. When any other software is activated, the display unit 62 generates an image based on the information sent from various units of software other than the information sent from the object display unit 72.

The input unit 64 includes an input interface (I/F) control unit 92, and sends an operation of the operator detected by the input device 34 to the object operation unit 74. The input interface control unit 92 converts the signal sent from the input device 34 into a signal analyzable by the retrieval unit 60, and sends the converted signal to the object operation unit 74.

The contents control unit 66 includes a file system 94, reads information from the internal storage 40 or the external storage 46, sends the read information to the contents access unit 86, and writes the information sent from the contents access unit 86 to the internal storage 40 or the external storage 46. The file system 94 is a function of managing read/write of information.

Figure 4:
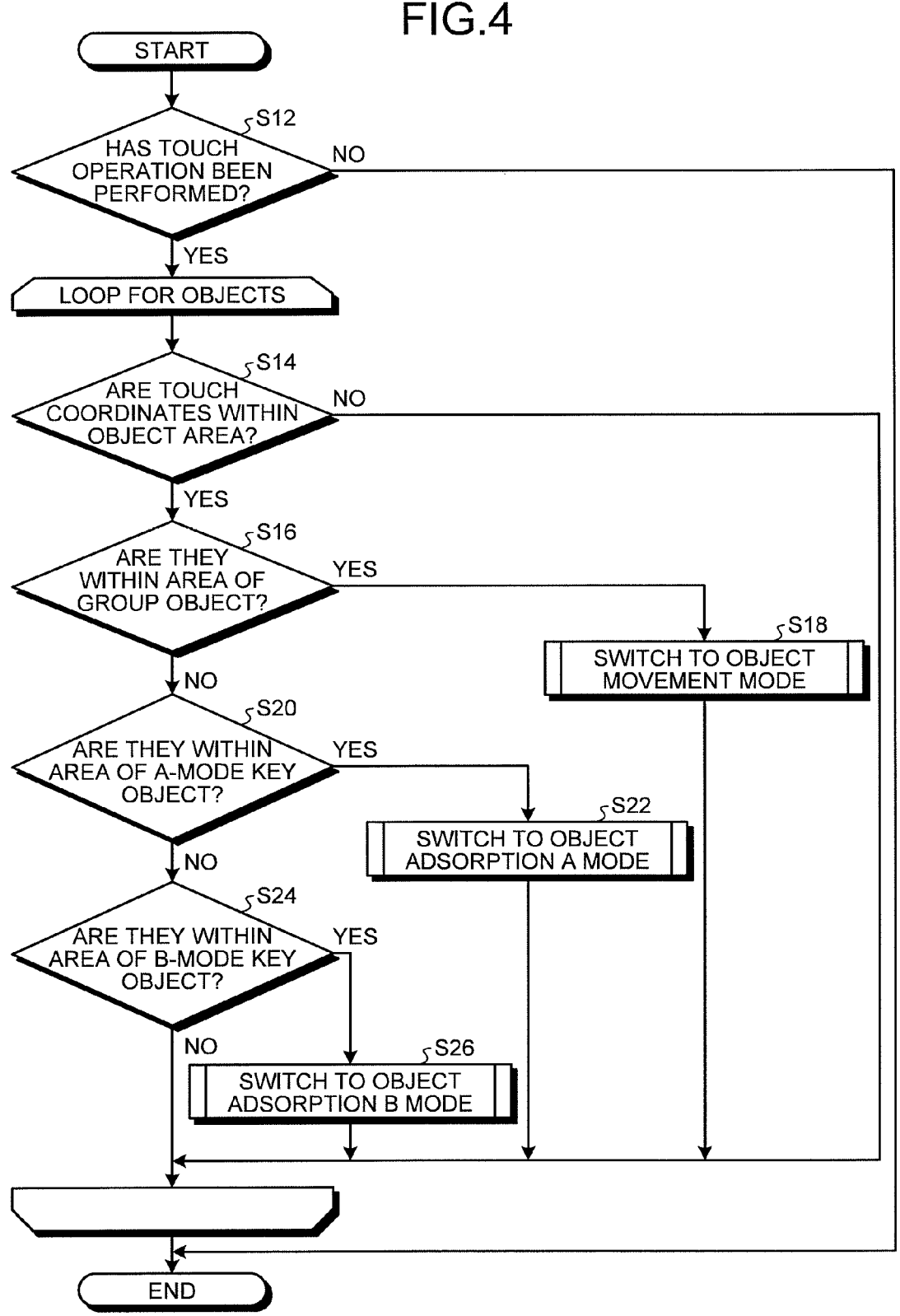
FIG. 4 is a flowchart illustrating one example of a processing operation of the mobile electronic communication device.

Next, the operation of the mobile electronic communication device 10, specifically, a search method of search refinement and an image display method performed in association with the search method will be explained below with reference to FIG. 4 to FIG. 12. FIG. 4 is a flowchart illustrating one example of a processing operation of the mobile electronic communication device.

First, when the units of software illustrated in FIG. 2 are activated, the group objects each containing a plurality of item objects, and the key objects are displayed on the screen of the display device 32 as illustrated in FIG. 3. When a predetermined operation is performed while the group objects each containing the item objects and the key objects appear in this manner, search refinement is performed. As the key object, two types of key objects such as a plurality of A-mode key objects and a plurality of B-mode key objects are displayed. The A-mode and the B-mode are different from each other in a point that a range (threshold) of relevance ratio of extracted item objects determined based on the operation of the key object is determined using different methods. Therefore, the A-mode key object and the B-mode key object may sometimes have the same search criteria (keyword, reference value, reference condition) used to perform the refinement.

The retrieval unit 60 determines whether a touch operation has been performed at Step S12. That is, the retrieval unit 60 determines whether the input device 34 has detected the operator's operation and the signal thereof is input to the object operation unit 74 through the input unit 64. When it is determined at Step S12 that the touch operation has not been performed (No), the retrieval unit 60 ends the process.

When it is determined at Step S12 that the touch operation has been performed (Yes), the retrieval unit 60 determines whether the touch coordinates are within an object area, at Step S14. That is, it is determined whether the position touched by the operator is an area corresponding to an object. For each of object displayed on the screen of the display device 32, an area of the input device 34 corresponding to a screen display on the display device 32 is set as an object area. When it is determined that the touch coordinates are within the object area (Yes), the retrieval unit 60 proceeds to Step S16. That is, when the touch coordinates are within the object area, the retrieval unit 60 determines that the instruction to operate the object is input, and switches to the operation of the object. When it is determined that the touch coordinates are not within the object area (No), the retrieval unit 60 ends the process.

When it is determined as Yes at Step S14, the retrieval unit 60 determines whether the touch coordinates are within an area of the group object, at Step S16. That is, it is determined whether the group object is specified as an operation target. When it is determined at Step S16 that the touch coordinates are within the area of the group object (Yes), that is, the group object is determined as the operation target, the retrieval unit 60 switches to an object movement mode, at Step S18. The object movement mode mentioned here represents a mode in which when the operator moves the touched position on the input device 34 from the group object-specified state, that is, when the touch coordinates are changed, the position of the group object is moved according to the change. In the object movement mode, when the touch operation is finished, that is, when the operator does not touch the input device 34, the retrieval unit 60 determines that the movement of the group object is finished, sets the position at which the touch operation is finished as the group object, and ends the process.

When it is determined at Step S16 that the touch coordinates are not within the area of the group object (No), that is, the group object is not the operation target, the retrieval unit 60 determines whether the touch coordinates are within an area of the A-mode key object, at Step S20. That is, the retrieval unit 60 determines whether the A-mode key object is specified as the operation target. When it is determined at Step S20 that the touch coordinates are within the area of the A-mode key object (Yes), the retrieval unit 6 switches to an object adsorption A mode, at Step S22. The object adsorption A mode will be explained after the explanation of the flowchart illustrated in FIG. 4 is finished. After the end of the process of the object adsorption A mode at Step S22, the retrieval unit 60 ends the process.

When it is determined at Step S20 that the touch coordinates are not within the area of the A-mode key object (No), that is, the A-mode key object is not the operation target, the retrieval unit 60 determines whether the touch coordinates are within an area of the B-mode key object, at Step S24. That is, the retrieval unit 60 determines whether the B-mode key object is specified as the operation target. When it is determined at Step S24 that the touch coordinates are within the area of the B-mode key object (Yes), the retrieval unit 6 switches to an object adsorption B mode, at Step S26. The object adsorption B mode will be explained afterward. After the end of the process of the object adsorption B mode at Step S26, the retrieval unit 60 ends the process.

When it is determined at Step S24 that the touch coordinates are not within the area of the B-mode key object (No), that is, the B-mode key object is not the operation target, the retrieval unit 60 ends the process. The retrieval unit 60 repeats the processes from the process at Step S14 before the process at the end of the processes by the number of all the objects in display. That is, the retrieval unit 60 repeats the determinations by the number of group objects and key objects in display, and performs processes corresponding to subsequent operations corresponding to selection of the group object and to selection of the key object. For example, when the group object is selected and moved, the item objects contained in the group object are also moved according to the movement. By providing the control in the above manner, the retrieval unit 60 can operate any one of the objects touched by the operator.

When there is a plurality of group objects on the screen, the retrieval unit 60 performs the determination at Step S16 on each of the group objects, performs, when there is a plurality of A-mode key objects, the determination at Step S20 on each of the A-mode key objects, and performs, when there is a plurality of B-mode key objects, the determination at Step S24 on each of the B-mode key objects.

Figure 5:
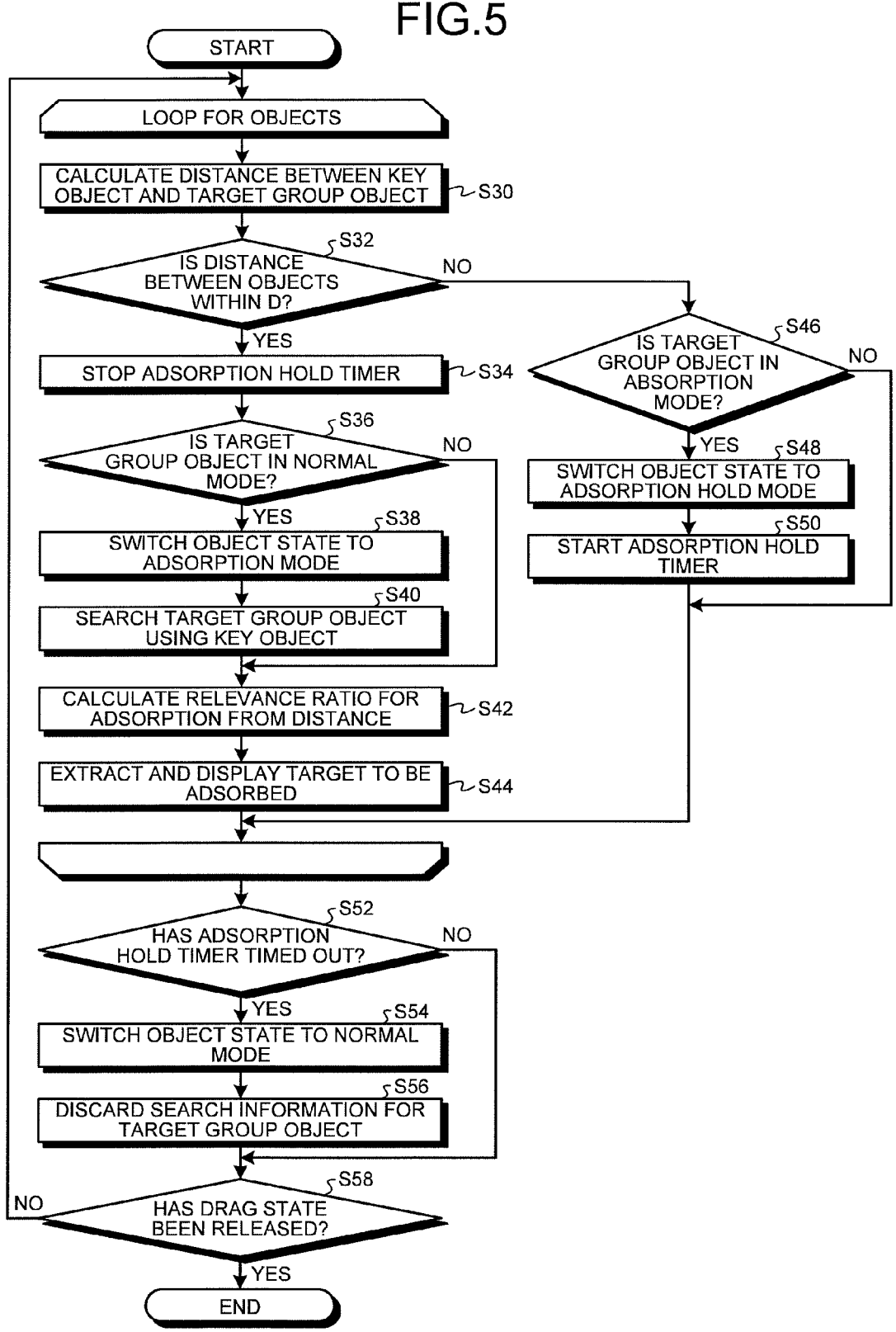
FIG. 5 is a flowchart illustrating one example of the processing operation of the mobile electronic communication device.

Next, the object adsorption A mode will be explained below with reference to FIG. 5 and FIG. 6A to FIG. 6E. FIG. 5 is a flowchart illustrating one example of the processing operation of the mobile electronic communication device when switching to the object adsorption A mode. The object adsorption A mode mentioned here is a mode in which a range of the relevance ratio of item objects extracted from the group object is fluctuated according to a distance between the key object and the group object. That is, the object adsorption A mode is a mode in which a threshold of the relevance ratio of item objects to be adsorbed to the key object is fluctuated according to the distance between the key object and the group object. Specifically, in the object adsorption A mode, when the distance between the key object and the group object is smaller, the range of the relevance ratio of extracted item objects is made wider, so that item object(s) with a low relevance ratio can be also extracted. In the object adsorption A mode, when the distance between the key object and the group object is larger, the range of the relevance ratio of extracted item objects is made narrower, so that only item object(s) with a high relevance ratio can be extracted. In the present embodiment, because it is set so as to extract item objects in descending order of the relevance ratio, if the range of the relevance ratio becomes wider, then item object(s) with a lower relevance ratio can be also extracted.

First, after the switch to the object adsorption A mode at Step S22, the retrieval unit 60 calculates a distance between the key object and a target group object, at Step S30. Here, because the key object is moved by the operator, the position of the key object means a position of the key object detected at the time of calculation at Step S30. The position as the basis of the group object is a preset position in the area of the group object, for example, the center of the area or an edge of the area. The target group object is a group object being a target on which search refinement is performed.

After the calculation of the distance at Step S30, the retrieval unit 60 determines whether the distance between the objects (the key object and the group object) is within D, at Step S32. Here, the distance D is such that the distance between the key object and the group object is a predetermined value or more and is set so that the search refinement is not performed therein.

When it is determined at Step S32 that the distance between the objects is within D (Yes), the retrieval unit 60 stops an adsorption hold timer, at Step S34. The adsorption hold timer is a timer that activates when the distance between the objects is larger than D. The details thereof will be explained later. When the target group object is in an adsorption hold mode explained later, the retrieval unit 60 stops the adsorption hold timer and then switches to an adsorption mode explained later.

After the stop of the adsorption hold timer at Step S34, the retrieval unit 60 determines whether the target group object is in a normal mode, at Step S36. The normal mode mentioned here is a mode of the initial state, in which the relevance ratio of an item object in the group object to a key object is not calculated. When it is determined at Step S36 that the target group object is not in the normal mode (No), then the retrieval unit 60 proceeds to Step S42. When the target group object is not in the normal mode at Step S36, the adsorption mode is selected.

When it is determined at Step S36 that the target group object is in the normal mode (Yes), the retrieval unit 60 switches the object state to the adsorption mode, at Step S38. That is, the retrieval unit 60 switches the object state from the normal mode to the adsorption mode, at Step S38. When switching to the adsorption mode at Step S38, the retrieval unit 60 searches the target group object using the key object, at Step S40. Specifically, the retrieval unit 60 calculates a relevance ratio to the key object for each of the item objects that belong to (that are contained in) the target group object.

When the relevance ratio of each of the item objects is calculated at Step S40, or when it is determined as No at Step S36, that is, when it is determined that the mode is already set as the adsorption mode, then the retrieval unit 60 calculates the relevance ratio for adsorption from the distance, at Step S42. That is, the retrieval unit 60 calculates a range of the relevance ratio for the adsorption to the key object, based on the distance between the key object and the target group object calculated at Step S30. Here, for the range of the relevance ratio, as explained above, a wider range is calculated (object(s) with a lower relevance ratio can also be extracted) as the distance is smaller, and a narrower range is calculated (only the object(s) with a higher relevance ratio can be extracted) as the distance is larger.

After the calculation of the range of the relevance ratio at Step S42, the retrieval unit 60 extracts and displays adsorption target(s), at Step S44. That is, the retrieval unit 60 extracts item object(s) whose relevance ratio calculated at Step S40 is included in the range of the relevance ratio calculated at Step S42 from among the item objects contained in the group object. Furthermore, the retrieval unit 60 causes the extracted item object(s) as adsorption target(s) to be displayed around the key object. After the display of the adsorption target(s) around the key object at Step S44, the retrieval unit 60 proceeds to Step S52.

When it is determined at Step S32 that the distance between the objects is not within D (No), that is, the distance between the objects is larger than D, the retrieval unit 60 determines whether the target group object is in the adsorption mode, at Step S46. When it is determined at Step S46 that the target group object is not in the adsorption mode (No), the retrieval unit 60 proceeds to Step S52.

When it is determined at Step S46 that the target group object is in the adsorption mode (Yes), the retrieval unit 60 switches the object state to the adsorption hold mode, at Step S48. That is, the retrieval unit 60 changes the mode of the target group object to the adsorption hold mode. The adsorption hold mode mentioned here represents a process of not performing calculation of the range of the relevance ratio or of not performing extraction of an item object from the target group object. As explained above, in this mode, the target group object and the key object are separated from each other by a certain distance or more.

After the switch to the adsorption hold mode at Step S48, the retrieval unit 60 starts counting the adsorption hold timer, at Step S50. The adsorption hold timer mentioned here represents a measurement means used as a basis of determination as to whether the mode is switched from the adsorption hold mode to the normal mode. The measurement of the time is implemented by using a time measurement unit built into the device or time measurement software. When starting counting the timer at Step S50, the retrieval unit 60 proceeds to Step S52.

The retrieval unit 60 repeats the processes from the process at Step S30 to the process right before Step S52 by the number of objects. That is, when a plurality of group objects are displayed, the retrieval unit 60 performs the processes on each of the groups.

When it is determined as No at Step S46, that is, when it is determined that the target group object is in the normal mode, or when the process at Step S44 or Step S50 is ended, the retrieval unit 60 determines whether the adsorption hold timer has timed out, at Step S52. The time as the basis of the timeout is previously set.

When it is determined at Step S52 that the adsorption hold timer has not timed out (No), the retrieval unit 60 proceeds to Step S58. When it is determined at Step S52 that the adsorption hold timer has timed out (Yes), the retrieval unit 60 switches the object state to the normal mode, at Step S54. That is, the retrieval unit 60 switches the object state from the adsorption hold mode to the normal mode. In the adsorption mode, the adsorption hold timer is not counted, therefore the retrieval unit 60 does not proceed to Step S54. After the switch to the normal mode at Step S54, the retrieval unit 60 discards the search information for the target group object, at Step S56.

That is, the retrieval unit 60 discards the information for the relevance ratio of each of the item objects contained in the target group object to the key object calculated at Step S40. Thereafter, the retrieval unit 60 proceeds to Step S58.

When it is determined as No at Step S52, or when the process at Step S56 is ended, the retrieval unit 60 determines whether the drag state has been released, at Step S58. That is, the retrieval unit 60 determines whether the input into the input device 34 by the operator is finished and the key object is not selected. When it is determined at Step S58 that the drag state has not been released (No), the retrieval unit 60 proceeds to Step S30 and repeats the processes. When it is determined at Step S58 that the drag state has been released (Yes), then the retrieval unit 60 ends the process.

Next, one of specific operation examples will be explained below with reference to FIG. 6A to FIG. 6E. FIG. 6A to FIG. 6E are explanatory diagrams for explaining operations of the mobile electronic communication device when each of the operations is performed in the object adsorption A mode. FIG. 6A to FIG. 6E represent one examples of screen display. The explanatory diagrams illustrated in FIG. 6A to FIG. 6E represent one group object and item objects contained therein and four A-mode key objects only, and do not represent other group objects and item objects contained therein and key objects.

Figure 6A:
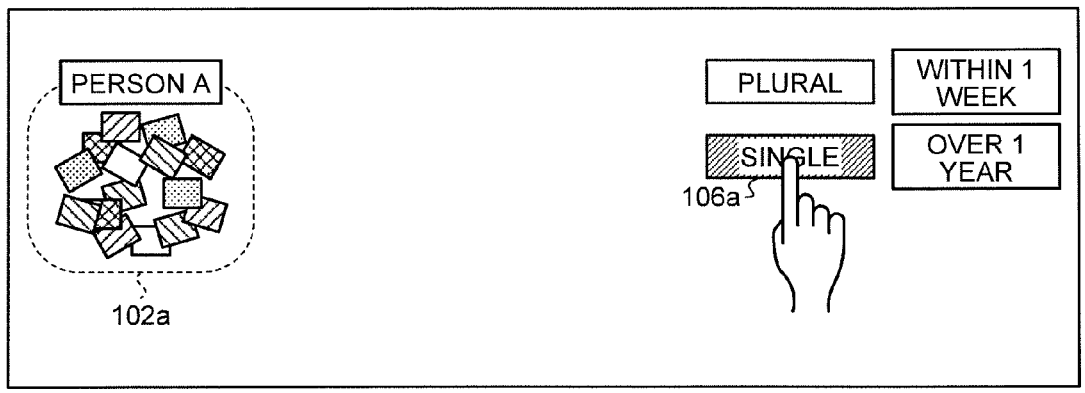
FIG. 6A is an explanatory diagram for explaining an operation of the mobile electronic communication device.

First, as illustrated in FIG. 6A, when an area corresponding to one of the key objects, a key object 106a "Single" in the present embodiment, is touched by the operator, the retrieval unit 60 determines that the key object 106a "Single" has been selected, and moves to the object adsorption A mode.

Figure 6B:
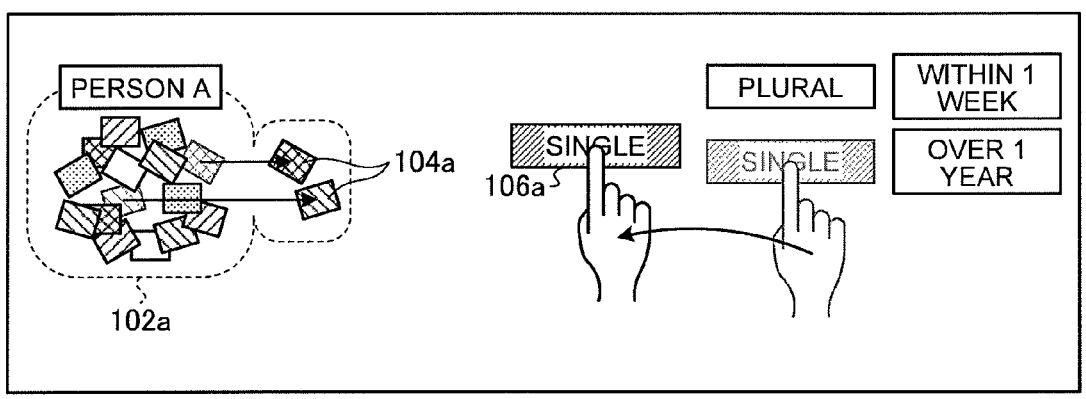
FIG. 6B is an explanatory diagram for explaining the operation of the mobile electronic communication device.

Subsequently, when the key object 106a "Single" is moved by the operator and a distance between the key object 106a and a group object 102a falls within the certain distance as illustrated in FIG. 6B, the retrieval unit 60 determines that the group object 102a is in the adsorption mode. Thereafter, the retrieval unit 60 calculates a relevance ratio of the each of the item objects contained in the group object 102a to the search criteria of the key object 106a. In the present embodiment, because the item object is an image file and the key object is "Single", the retrieval unit 60 calculates a relevance ratio (which is also a matching rate in this case) on the basis of the determination as to whether the image file is an image where someone is photographed alone. As for the level of the relevance ratio, in the case of image file capable of determining that someone is photographed perfectly alone, the relevance ratio becomes 100%, while in the case of image file capable of determining that the image is not clear or that some other person is photographed small, the relevance ratio becomes low. Whether something is photographed in an image can be automatically analyzed by using image analysis software or a face recognition system. When the relevance ratio of each of the item objects is calculated, the retrieval unit 60 calculates a range of the relevance ratio of each item object to be adsorbed based on the distance between the key object 106a and the group object 102a. Thereafter, the retrieval unit 60 extracts item objects whose relevance ratio is included in the range of the relevance ratio from among the item objects in the group object 102a based on the result of calculation. Furthermore, as illustrated in FIG. 6B, the retrieval unit 60 moves the extracted item objects 104a to the side of the key object 106a "Single", and causes them to be adsorbed to the key object 106a.

Figure 6C:
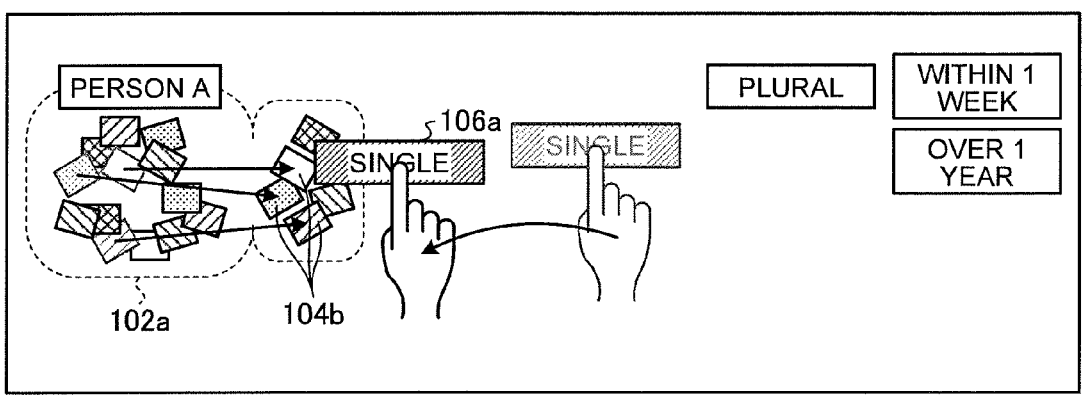
FIG. 6C is an explanatory diagram for explaining the operation of the mobile electronic communication device.

When the key object 106a "Single" is further moved from the position illustrated in FIG. 6B to the side of the group object 102a and the distance between the key object 106a and the group object 102a becomes smaller (shorter), the retrieval unit 60 calculates a wider range of the relevance ratio of item objects to be adsorbed. By calculating the wider range of the relevance ratio, the retrieval unit 60 also extracts item objects whose relevance ratio is lower, and, as illustrated in FIG. 6C, more item objects 104b are adsorbed to the key object 106a "Single".

Subsequently, when the operator takes his/her hand off the input device 34 and releases the drag state, which is the untouched state of the input device 34, item objects to be extracted (adsorbed) are fixed by the retrieval unit 60. That is, the retrieval unit 60 fixes the range of the relevance ratio of the item object to be extracted, and extracts the item objects satisfying the range of the relevance ratio. The retrieval unit 60 sets a group of the extracted item objects as a new group object 102b.

Figure 6D:
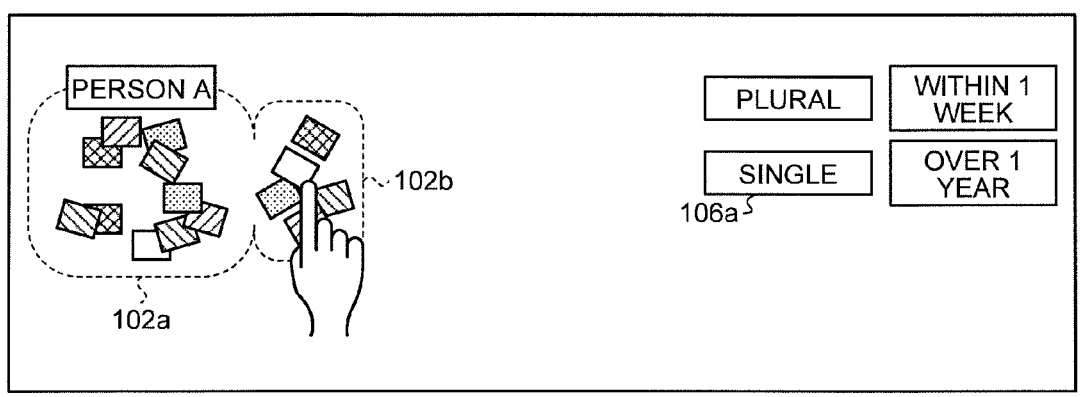
FIG. 6D is an explanatory diagram for explaining the operation of the mobile electronic communication device.
Figure 6E:
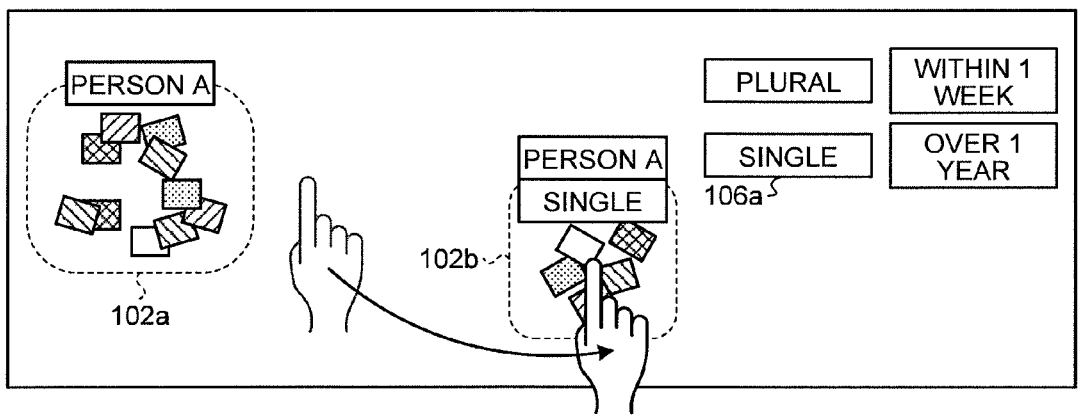
FIG. 6E is an explanatory diagram for explaining the operation of the mobile electronic communication device.

Subsequently, when the operator touches the group of the extracted item objects and separates the group of the extracted item objects from the original group object 102a as illustrated in FIG. 6D, the group is separately displayed as a new group object 102b, as illustrated in FIG. 6E. At this time, the new group object 102b is named by adding the name of the key object 106a to the name of the original group object 102a. That is, the search criteria used for the extraction are displayed as the name of the group object 102b. This enables an attribute of the group object to be easily recognized.

Figure 7B:
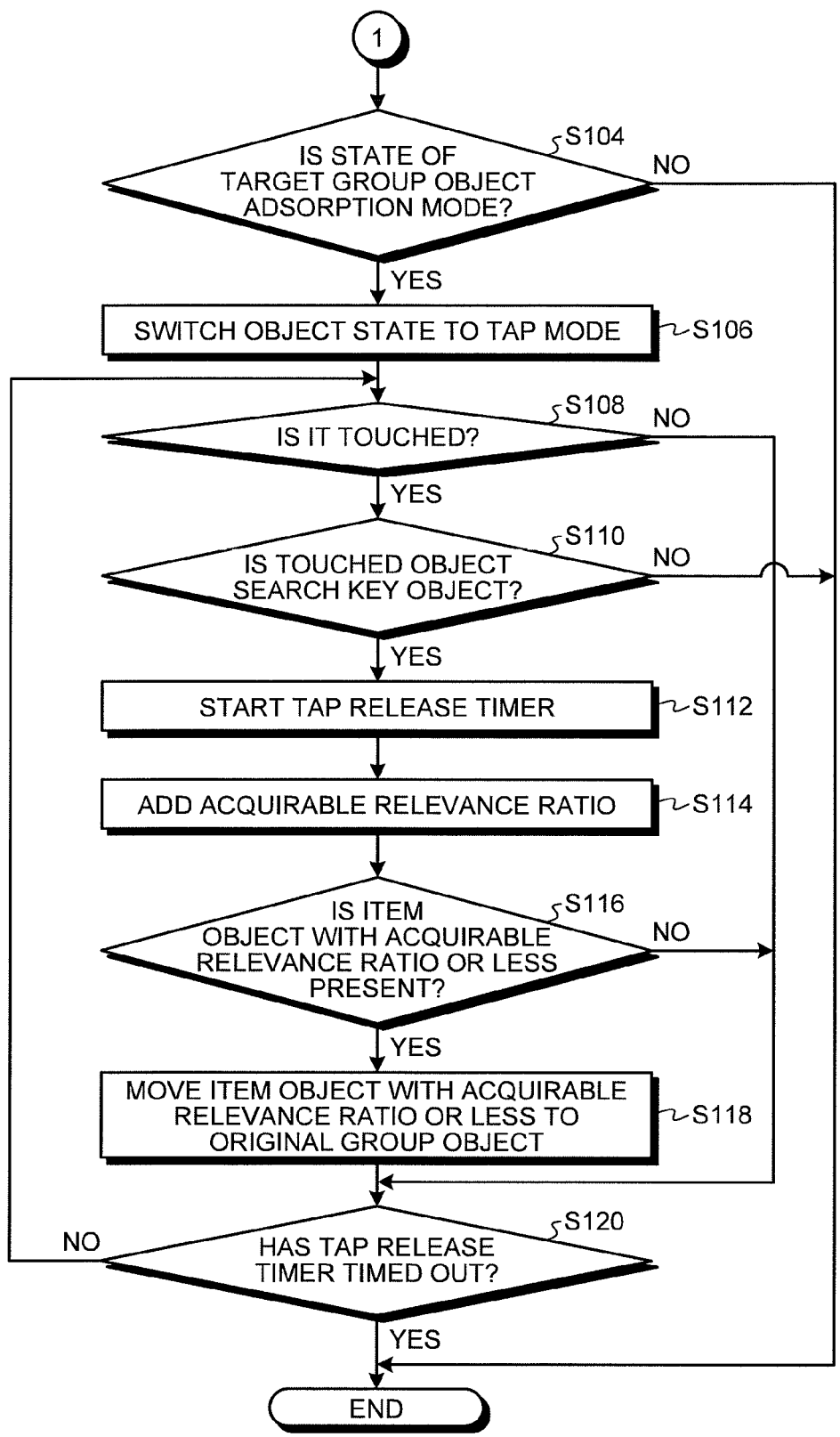
FIG. 7B is a flowchart illustrating one example of the processing operation of the mobile electronic communication device.

Next, the object adsorption B mode will be explained below with reference to FIG. 7A to FIG. 12. FIG. 7A and FIG. 7B are flowcharts illustrating one example of the processing operation of the mobile electronic communication device when the object state is switched to the object adsorption B mode. Here, the object adsorption B mode is a mode in which the range of the relevance ratio of item objects extracted from the group object is fluctuated according to the distance in which the key object moves within the group object. That is, it is a mode in which a threshold of the relevance ratio of item objects to be adsorbed to the key object is fluctuated according to the distance in which the key object moves within the group object. Specifically, in the object adsorption B mode, if the distance in which the key object moves within the group object is larger, then the range of the relevance ratio of the item objects to be extracted is made wider, so that item object(s) with a low relevance ratio can be also extracted. If the distance in which the key object moves within the group object is smaller, then the range of the relevance ratio of the item objects to be extracted is made narrower, so that only item object(s) with a high relevance ratio can be extracted. In the present embodiment, because it is set so as to extract item objects in descending order of the relevance ratio, if the range of the relevance ratio becomes wider, then item object(s) with a lower relevance ratio can be also extracted.

First, after the switch to the object adsorption B mode at Step S26, the retrieval unit 60 determines whether the key object is within the group object, at Step S60. In other words, the retrieval unit 60 determines whether the touch coordinates are within the area of the group object while the key object is operated. That is, the retrieval unit 60 determines whether the key object has been moved into the area of the group object.

When it is determined at Step S60 that the key object is within the area of the group object (Yes), the retrieval unit 60 stops the adsorption hold timer, at Step S62. The adsorption hold timer is a timer for counting the time when the key object is not within the area of the group object, and is used when the object state of the group object is the adsorption hold mode explained later.

After the stop of the adsorption hold timer at Step S62, the retrieval unit 60 determines whether the state of the target group object (object state) is the adsorption mode, at Step S64. The target group object mentioned here represents a group object as an extraction target of an item object. In addition, the adsorption mode is a mode in which a relevance ratio of each of the item objects contained in the group object to the key object is calculated and a target group object can be adsorbed to the key object. The adsorption mode can be switched by performing the processes at Step S92 and Step S94 explained later. In the case of the adsorption hold mode, by stopping the adsorption hold timer, the state is switched to the adsorption mode.

When it is determined at Step S64 that the state is the adsorption mode (Yes), the retrieval unit 60 calculates a movement distance and a speed from the previous coordinates and the present coordinates and from the previous time and the present time respectively, at Step S66. Thereafter, the retrieval unit 60 calculates a relevance ratio to be reduced, from the movement distance (or the speed), and reduces the relevance ratio to an acquirable relevance ratio, at Step S68. The acquirable relevance ratio mentioned here represents a relevance ratio used as a threshold. In the present embodiment, because the item objects are extracted in descending order of the relevance ratio, by calculating a relevance ratio to be reduced based on the movement distance and setting the acquirable relevance ratio used as a lower limit, the range of the relevance ratio of the item objects to be extracted can be set. Because a detection timing of the coordinates and that of the time are the same as each other, the movement distance and the moving speed bear a proportional relation, and thus, even if an acquirable relevance ratio is calculated using either one of the movement distance and the speed, the acquirable relevance ratios as results of calculation become the same as each other. In the example, the moving speed is set as an average moving speed, however, the range of the relevance ratio may be set based on the maximum value of the moving speed instead of the average moving speed. For example, the maximum speed of the moving speed, regardless of the movement distance, is calculated, and if the maximum speed is high, then the range of the relevance ratio may be widened, while if the maximum speed is low, then the range of the relevance ratio may be narrowed. In the embodiment, the range of the relevance ratio is set based on the movement distance and/or the moving speed, however, the range of the relevance ratio may be determined based on the length of the time during which the key object stays within the group object. For example, the range of the relevance ratio may be made wider as the time during which the key object stays within the group object becomes longer regardless of whether the key object moves. Therefore, if the time during which the key object stays within the group object is long, the range of the relevance ratio may be widened, while if the time during which the key object stays within the group object is short, then the range of the relevance ratio may be narrowed. These calculation methods may be combined with each other.

After the calculation of the acquirable relevance ratio at Step S68, the retrieval unit 60 determines whether item object(s) with the acquirable relevance ratio or higher is present, at Step S70. That is, the retrieval unit 60 determines whether there is item object(s) with a relevance ratio included in the range of the relevance ratio. When it is determined at Step S70 that the item object(s) with the acquirable relevance ratio or higher is present (Yes), the retrieval unit 60 moves the item object(s) with the acquirable relevance ratio or higher to the key object, at Step S72. That is, the retrieval unit 60 adsorbs the item object(s) with the relevance ratio included in the range of the relevance ratio to the key object. Thereafter, the retrieval unit 60 proceeds to Step S88. When it is determined at Step S70 that the item object with the acquirable relevance ratio or higher is not present (No), the item object to be adsorbed is not present, and therefore the retrieval unit 60 proceeds to Step S88. At Step S70 and Step S72, the rest of the item objects, except for item object(s) processed in the previous process, may be processed. That is, the retrieval unit 60 determines whether there is item object(s) to be adsorbed newly, and if there is item object to be adsorbed newly, then the item object(s) may be adsorbed to the key object.

Next, when it is determined at Step S64 that the object state is not the adsorption mode (No), the retrieval unit 60 determines whether the object state of the target group object is the normal mode, at Step S74. When it is determined at Step S74 that it is not the normal mode (No), the retrieval unit 60 proceeds to Step S88. When it is determined at Step S74 that it is the normal mode (Yes), the retrieval unit 60 switches the object state to an adsorption candidate mode, at Step S76, starts counting an adsorption candidate timer, at Step S78, and then proceeds to Step S88. The adsorption candidate mode mentioned here is a mode that is set for switch from the normal mode to the adsorption mode. Adsorption is not performed during the adsorption candidate mode even if the key object is within the area of the group object. When the key object stays within the area of the group object for a certain time in the adsorption candidate mode, the object state is switched to the adsorption mode. Thus, even if the key object is caused to pass through the area of any group object other than a desired group object for a short time in order to move the key object before the adsorption is started, the item object in the group object through which the key object has passed can be prevented from being adsorbed to the key object.

When it is determined at Step S60 that the key object is not within the area of the group object (No), the retrieval unit 60 stops the adsorption candidate timer, at Step S80. After the stop of the adsorption candidate timer at Step S80, the retrieval unit 60 determines whether the object state of the target group object is the adsorption mode, at Step S82. When it is determined at Step S82 that it is not the adsorption mode (No), the retrieval unit 60 proceeds to Step S88. When it is determined at Step S82 that it is the adsorption mode (Yes), the retrieval unit 60 switches the object state to the adsorption hold mode at Step S84, and starts the adsorption hold timer, at Step S86. Step S84 and Step S86 are the same processes as these at Step S48 and Step S50 in the flowchart illustrated in FIG. 5. Accordingly, explanation thereof is omitted.

The retrieval unit 60 repeats the processes from the process at Step S60 to the process right before Step S88 by the number of objects. That is, when a plurality of target group objects are displayed, the retrieval unit 60 performs the processes on each of the groups.

When it is determined as No at Step S70, Step S74, or Step S82, or when the process at Step S72, Step S78, or Step S86 is ended, the retrieval unit 60 sets the present coordinates as the previous coordinates and saves the present time as the previous time at Step S88. That is, the retrieval unit 60 updates the coordinates and the time. After the update of the coordinates and the time at Step S88, the retrieval unit 60 determines whether the adsorption candidate timer has timed out, at Step S90. That is, the retrieval unit 60 determines whether the certain time or more has passed while the key object stays in the area of the target group object.

When it is determined at Step S90 that it has timed out (Yes), the retrieval unit 60 switches the object state to the adsorption mode at Step S92, and then searches a target group object using the key object, at Step S94. Specifically, the retrieval unit 60 calculates a relevance ratio to the key object for each item object belonging to (contained in) the target group object. After the search at Step S94, the retrieval unit 60 proceeds to Step S102.

When it is determined at Step S90 that it has not timed out (No), the retrieval unit 60 determines whether the adsorption hold timer has timed out, at Step S96. When it is determined at Step S96 that it has not timed out (No), the retrieval unit 60 proceeds to Step S102. When it is determined at Step S96 that it has timed out (Yes), the retrieval unit 60 switches the object state to the normal mode at Step S98. That is, the retrieval unit 60 switches the object state from the adsorption hold mode to the normal mode. After the switch to the normal mode at Step S98, the retrieval unit 60 discards the search information for the target group object, at Step S100. In other words, the retrieval unit 60 discards the information for the relevance ratio of each of the item objects, to the key object, contained in the target group object calculated at Step S94. Thereafter, the retrieval unit 60 proceeds to Step S102.

When it is determined as No at Step S96, or when the process at Step S94 or Step S100 is ended, the retrieval unit 60 determines whether the drag state has been released, at Step S102. That is, the retrieval unit 60 determines whether the operator finishes the input to the input device 34 and the key object is not selected. When it is determined at Step S102 that the drag state has not been released (No), the retrieval unit 60 proceeds to Step S60 and repeats the processes. When it is determined at Step S102 that the drag state has been released (Yes), the retrieval unit 60 proceeds to Step S104.

The retrieval unit 60 determines whether the target group object is in the adsorption mode at Step S104. When it is determined at Step S104 that it is not in the adsorption mode (No), the retrieval unit 60 ends the process as it is.

When it is determined at Step S104 that it is in the adsorption mode (Yes), the retrieval unit 60 switches the object state to a tap mode at Step S106, and proceeds to Step S108. The tap mode mentioned here represents a mode in which if a tap (click) process is detected by the input device 34 while the key object is within the area of the target group object, an acquirable relevance ratio is caused to fluctuate so as to narrow the range of the relevance ratio.

The retrieval unit 60 determines whether it is touched at Step S108. That is, the retrieval unit 60 determines whether the input device 34 is touched by the operator. When it is determined at Step S108 that it is not touched (No), the retrieval unit 60 proceeds to Step S120. When it is determined at Step S108 that it is touched (Yes), the retrieval unit 60 determines whether the touched object is a search key object, that is, it is a key object used to perform search refinement, at Step S110. When it is determined at Step S110 that the key object is not touched (No), that is, any other part is touched, the retrieval unit 60 ends the process.

When it is determined at Step S110 that the key object is touched (Yes), the retrieval unit 60 starts counting a tap release timer, at Step S112. The tap release timer mentioned here represents a measurement means as a basis of determination as to whether the tap mode is released. After the start of the tap release timer at Step S112, the retrieval unit 60 adds an acquirable relevance ratio thereto, at Step S114. Specifically, the retrieval unit 60 calculates an acquirable relevance ratio to be added according to an interval between the touch detected at Step S108 and the release of the previous touch (when the drag is released at Step S102 or when the touch is released at previous Step S108). In the present embodiment, when the time interval is longer, an acquirable relevance ratio to be added (that is, a value to change the acquirable relevance ratio) is made greater, while when the time interval is shorter, an acquirable relevance ratio to be added is made smaller. That is, a fluctuation width for increasing the acquirable relevance ratio is made greater as the time interval is longer, so that the range of the relevance ratio is narrowed, while the fluctuation width for increasing the acquirable relevance ratio is made smaller as the time interval is shorter, so that the range of the relevance ratio is not narrowed so much.

After the addition of the acquirable relevance ratio at Step S114, the retrieval unit 60 determines whether item object(s) with the acquirable relevance ratio or less is present, at Step S116. That is, the retrieval unit 60 determines whether item object(s) with the acquirable relevance ratio or less (which is not included in the range of the relevance ratio) is present among the item objects adsorbed to the key object. When it is determined at Step S116 that item object(s) with the acquirable relevance ratio or less is not present (No), the retrieval unit 60 proceeds to Step S120. When it is determined at Step S116 that item object(s) with the acquirable relevance ratio or less is present (Yes), the retrieval unit 60 moves the item object(s) with the acquirable relevance ratio or less to the original group object, at Step S118. That is, the retrieval unit 60 returns the item object(s) with the acquirable relevance ratio or less from the state where it is adsorbed to the key object to the state where it belongs to the original group object. Thereafter, the retrieval unit 60 proceeds to Step S120.

When it is determined as No at Step S108 and Step S116, or when the process at Step S118 is ended, the retrieval unit 60 determines whether the tap release timer has timed out, at Step S120. When it is determined at Step S120 that it has not timed out (No), the retrieval unit 60 proceeds to Step S108 and repeats the processes, and when it is determined that it has timed out (Yes), the retrieval unit 60 ends the process. That is, the retrieval unit 60 repeats the processes in the tap mode until it has timed out or any area other than the key object is touched.

Figure 8A:
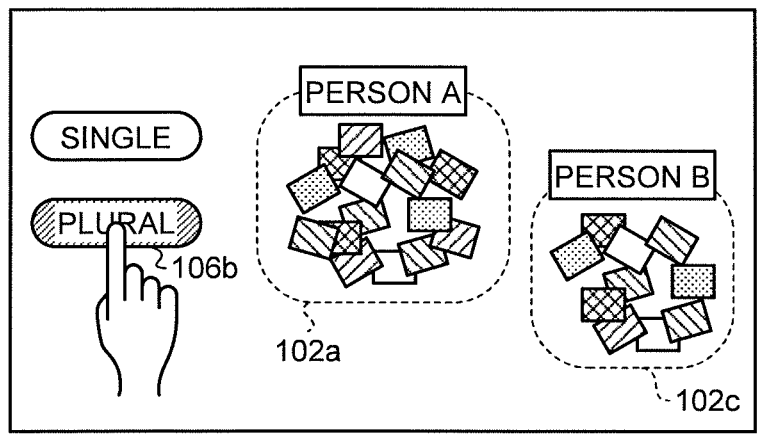
FIG. 8A is an explanatory diagram for explaining an operation of the mobile electronic communication device.
Figure 8B:
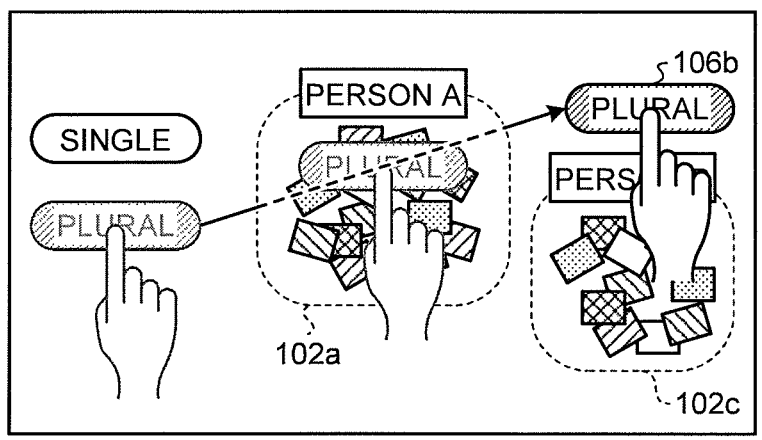
FIG. 8B is an explanatory diagram for explaining the operation of the mobile electronic communication device.
Figure 8C:
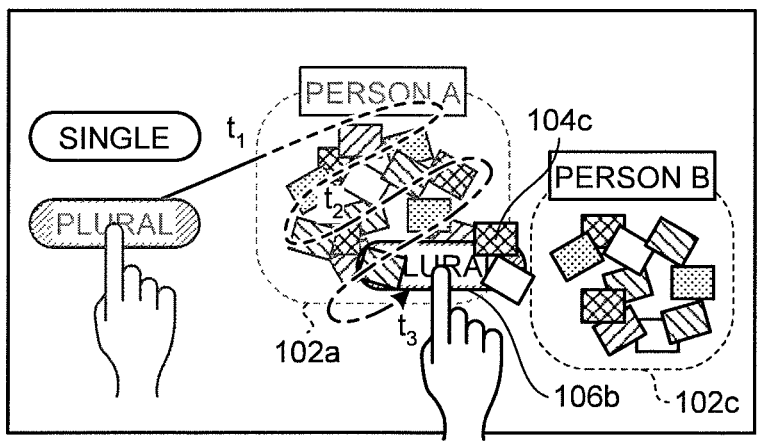
FIG. 8C is an explanatory diagram for explaining the operation of the mobile electronic communication device.
Figure 9:
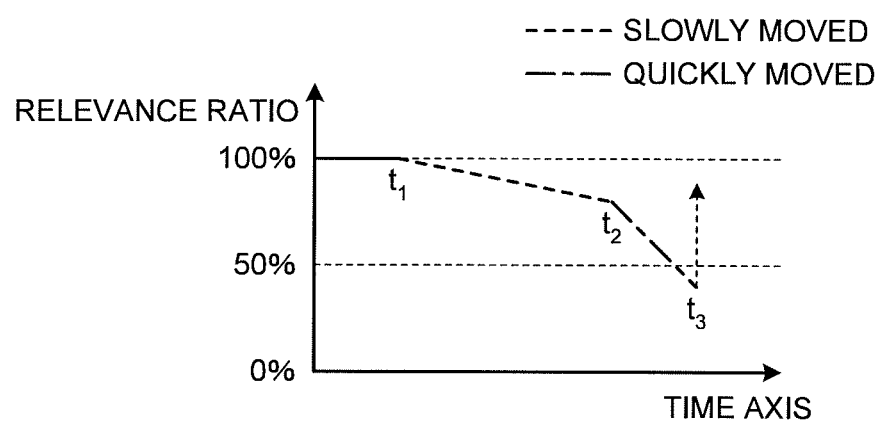
FIG. 9 is a graph for explaining the operations of the mobile electronic communication device.
Figure 10A:
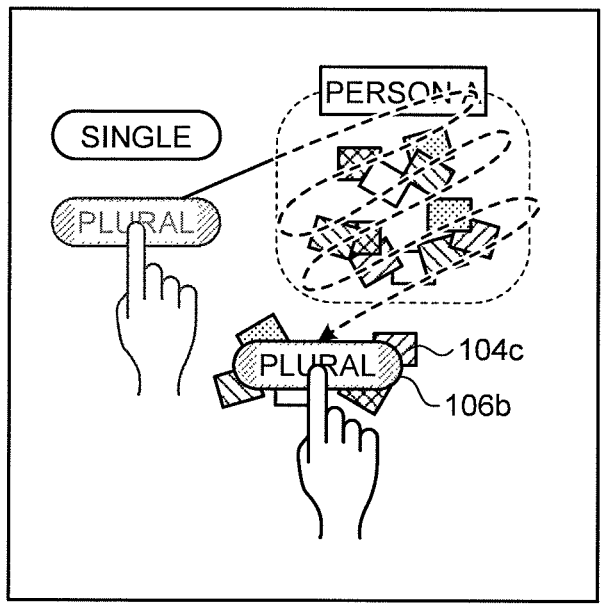
FIG. 10A is an explanatory diagram for explaining an operation of the mobile electronic communication device.
Figure 10B:
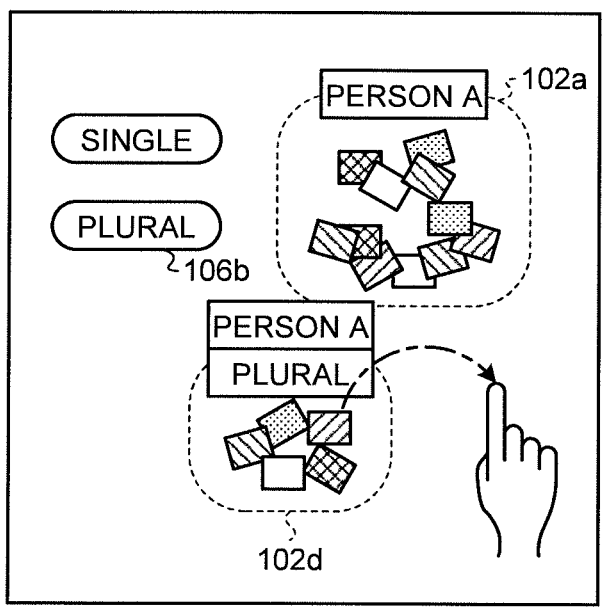
FIG. 10B is an explanatory diagram for explaining the operation of the mobile electronic communication device.
Figure 11:
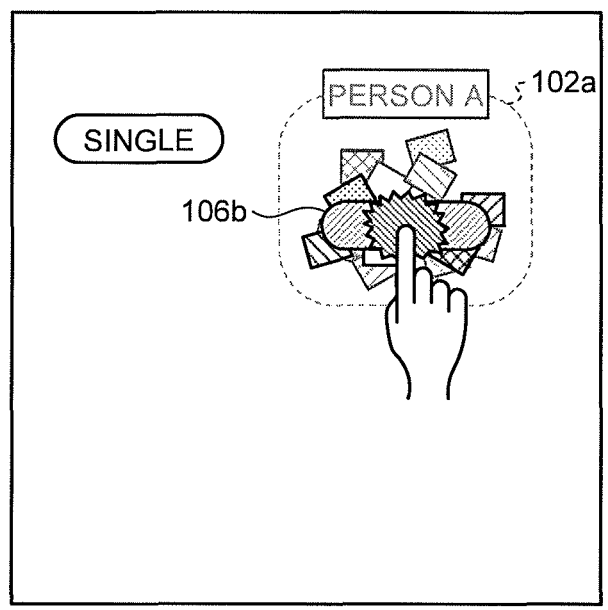
FIG. 11 is an explanatory diagram for explaining an operation of the mobile electronic communication device.
Figure 12:
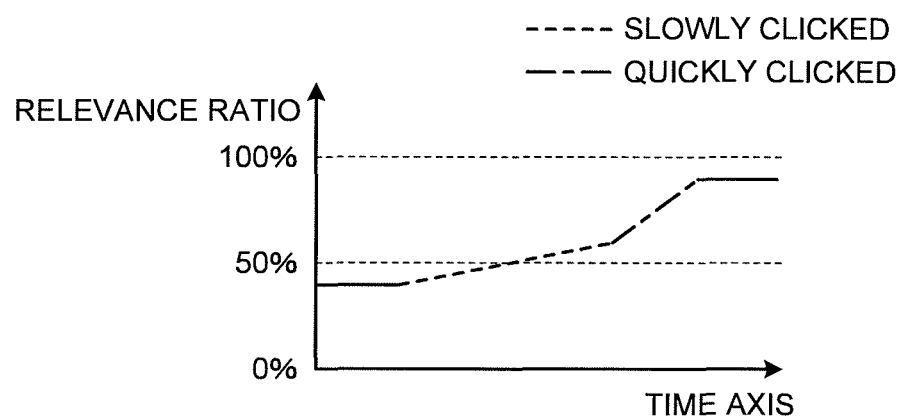
FIG. 12 is a graph for explaining the operations of the mobile electronic communication device.

Next, one of the specific operation examples will be explained below with reference to FIG. 8A to FIG. 12. FIG. 8A to FIG. 8C are explanatory diagrams for explaining operations of the mobile electronic communication device when each of the operations is performed in the object adsorption B mode. FIG. 9 is a graph for explaining the operations of the mobile electronic communication device. FIG. 10A, FIG. 10B, and FIG. 11 are explanatory diagrams for explaining operations of the mobile electronic communication device when each of the operations is performed in the object adsorption B mode. FIG. 12 is a graph for explaining the operations of the mobile electronic communication device. FIG. 8A to FIG. 8C and FIG. 10A, FIG. 10B, and FIG. 11 illustrate the group object and the key object related to the target of the operation and omit some group objects and key objects, respectively.

First, as illustrated in FIG. 8A, when an area corresponding to one of the key objects, a key object 106b "Plural" in the present embodiment, is touched by the operator, the retrieval unit 60 determines that the key object 106b "Plural" has been selected, and switches to the object adsorption B mode.

Subsequently, the key object 106b "Plural" is moved by the operator. At this time, if the key object 106b passes through the group object 102a in a short time, the state of the group object 102a is not changed to the adsorption mode. Therefore, the search refinement is not performed, and no item object is adsorbed to the key object 106b as illustrated in FIG. 8B. In this way, by setting so that the state is not switched to the adsorption mode when the key object passes through the group object only in a short time, even if it is desired to perform the search refinement of a group object 102c using the key object 106b, the key object 106b does not need to be moved so as to go around the area of the group object 102a.

When the key object 106b is operated by the operator to be moved across the area of the group object 102a for a certain time or more and at a certain speed or higher, the state of the group object 102a is changed to the adsorption mode. With this feature, the retrieval unit 60 calculates a relevance ratio of each of the item objects contained in the group object 102a to the search criteria of the key object 106b. In the present embodiment, the item object is an image file and the key object is "Plural", and therefore the retrieval unit 60 calculates a relevance ratio (also a matching rate in this case) on the basis of the determination as to whether a plurality of persons are photographed in the image file. As for the level of the relevance ratio, in the case of image file capable of determining that a plurality of persons are clearly photographed, the relevance ratio becomes 100%, while in the case of image file capable of determining that the image is not clear or that a plurality of subjects that look like persons are photographed or something like that, the relevance ratio becomes low. After the calculation of the relevance ratio of each of the item objects, the retrieval unit 60 calculates an acquirable relevance ratio (that is, a range of the relevance ratio) based on the movement distance and/or the moving speed of the key object 106b. Thereafter, the retrieval unit 60 extracts item objects whose relevance ratio is included in the range of the relevance ratio from among the item objects in the group object 102a based on the result of calculation. Furthermore, as illustrated in FIG. 8C, the retrieval unit 60 moves the extracted item objects 104c to the side of the key object 106b "Plural", and causes them to be adsorbed to the key object 106b.

Here, the acquirable relevance ratio changes like the graph illustrated in FIG. 9 according to the movement distance and/or the moving speed within the area of the group object. Specifically, as illustrated in FIG. 9, the object state is changed to the adsorption mode at time t1 after a certain time has passed since entering of the key object to the area of the group object, and calculation of an acquirable relevance ratio is started. Thereafter, in a period during which the key object is moved slowly, like a period from time t1 to time t2, the rate of the change in the acquirable relevance ratio is small, that is, the acquirable relevance ratio gradually changes. In a period during which the key object is moved quickly, like a period from time t2 to time t3, the rate of the change in the acquirable relevance ratio is large, that is, the acquirable relevance ratio largely changes. In this manner, how to change the area of the relevance ratio can be adjusted depending on how the operator moves the key object, thus improving the operability.

Next, as illustrated in FIG. 10A, when the key object 106b with the item objects 104c in the group object adsorbed thereto is moved to the outside of the area of the group object and is then released from the drag state, the key object with the item objects is separately displayed as a new group object 102d as illustrated in FIG. 10B. At this time, the new group object 102d is named by adding the name of the key object 106b to the name of the original group object 102a. That is, the search criteria used for the extraction are displayed as the name of the group object. This enables the attribute of the group object to be easily recognized.

As illustrated in FIG. 11, when the key object 106b is released from its drag state while being within the area of the group object 102a, and if the key object 106b is touched, the retrieval unit 60 recalculates the acquirable relevance ratio and changes the acquirable relevance ratio to be a higher level. That is, when the key object 106b is clicked while being within the area of the group object 102a, the retrieval unit 60 recalculates the acquirable relevance ratio and changes the acquirable relevance ratio to be a higher level. This causes the item object(s) whose relevance ratio is the acquirable relevance ratio or less, among the item objects adsorbed to the key object, to be returned from the adsorbed state to the state of belonging to the group object. That is, the item object(s) whose relevance ratio is low and becomes the acquirable relevance ratio or less is changed to a state of not being adsorbed. In this manner, it is configured that the click increases the level of the acquirable relevance ratio, and this enables an item object with a low relevance ratio to be removed when too many item objects are adsorbed. Therefore, a desired number of item objects can be adsorbed without restarting the processes.

Here, when the acquirable relevance ratio is changed by clicking (tapping) the key object, it is preferable to change the rate (inclination) of the change in the acquirable relevance ratio using the click timing, as illustrated in FIG. 12. For example, as illustrated in FIG. 12, it is preferable to set so that, in the case of a slow click, the rate (inclination) of the change in the acquirable relevance ratio is made smooth, that is, the acquirable relevance ratio is gradually increased, and so that, in the case of a quick click (clicked in a short interval), the rate (inclination) of the change in the acquirable relevance ratio is made sharp, that is, the acquirable relevance ratio is sharply increased. In this manner, by changing the rate (inclination) of the change in the acquirable relevance ratio using the click timing (interval), the operator can easily and appropriately adjust the adsorbed state of the item object, thus improving the operability. In the embodiment, the acquirable relevance rate is changed based on the interval and time of click, however, the present invention is not limited thereto. For example, an acquirable relevance ratio to be changed in one click is previously set, so that a change amount (rate to be changed) of the acquirable relevance ratio may be determined based on the number of click times.

The mobile electronic communication device 10 calculates the range of the relevance ratio of the item object to be extracted based on the positional relationship between the group object and the key object, and extracts the item object that satisfies the range of the relevance ratio, so that the operator can visually recognize the search result. This enables the operator to easily obtain his/her desired search result. In addition, the level of the relevance ratio can be easily adjusted through the operation of the operator, thus improving operator's operability.

By displaying the extracted item objects adsorbed to the key object, the number of extracted item objects can be recognized, thus improving the operability, also in this respect. In the present embodiment, the display of the item object adsorbed to the key object represents that the item object has been extracted, however, the present invention is not limited thereto. It is only necessary for the operator to visually recognize the extraction of the item object due to retrieval of the key object, and thus the number of extracted item objects may be displayed.

It is preferable to set a display area of the group object in proportion to the number of item objects belonging to the group object. That is, it is preferable that the group object with a smaller number of item objects belonging thereto is displayed in a smaller area and the group object with a larger number of item objects belonging thereto is displayed in a larger area. It is also preferable to display a group of item objects adsorbed to the key object in the above manner. This enable the operator to easily and visually recognize the adsorbed state of the item objects, thus improving the operability.

As for the group object and/or the group of item objects, a line along the outer periphery (outline) of its display area, that is, an outline of the group object is preferably displayed. By specifying the outer periphery of the display area by the line in this way, the size of the display area can be accurately recognized, which enables the operator to appropriately perform the touch operation.

In the embodiment, the range of the relevance ratio is calculated after the relevance ratio of each of the item objects is calculated, however, the sequence of processes for calculating the relevance ratio and calculating the range of the relevance ratio makes no difference. Because the amount of calculation can be reduced, the relevance ratio of the item object which is once calculated is preferably used until it is discarded. In the present embodiment, the retrieval unit calculates the relevance ratio of each of the item objects, however, the present invention is not limited thereto. It is only necessary to determine the relevance ratio of each of the item objects, and therefore information for the relevance ratio supplied from an external device via a network or the like may be used.

In the present embodiment, after a key object being search criteria and a group object being a target to be searched are determined, the relevance ratio of each of item objects is calculated, however, the present invention is not limited thereto. For example, the relevance ratio of an item object to each of key objects is previously calculated at the time of creating the key object and the group object, and after the key object being search criteria and the group object being a target to be searched are determined, the result of calculation is read, so that the relevance ratio of each of the item objects to the key object may be acquired.

The embodiment has explained the image file as an example, however, as explained above, the embodiment can also be used to retrieve a music file, retrieve a home page, and the like. Furthermore, it may be used to retrieve a destination (the other party to be communicated). In this case, the group object functions as so-called address book, and the item object functions as an individual address (destination specifying object). As the key object in this case, 'name of address: "A" line', part of telephone number, part of mail address, group of addresses, and the like are exemplified. The individual address stores therein information such as name, telephone number, mail address, and address. In addition, it may be configured to switch the state to a mode in which a phone call is made to the individual address extracted as a result of retrieval using the address book, or to switch the state to a mail composition screen on which mail to be sent to the extracted individual address is composed. In this case, the communication unit 26 performs communication with a specified destination based on the information stored in at least one individual address selected from among the extracted individual addresses through the operation by the operator to the input device 34, thus sending mail and making a phone call.

For example, when the item objects are images representing telephone numbers in address book data, and if the user selects one of the item objects, the CPU 22 executes the process for requiring a phone call with a telephone number corresponding to the selected item object. When the item objects are images representing mail addresses in the address book data, and if the user selects one of the item objects, the CPU 22 displays the screen for composing mail to be sent to a mail address corresponding to the selected item object on the display device 32. When the item objects are images representing addresses of WEB pages (URL: Uniform Resource Locator), and if the user selects one of the item objects, the CPU 22 makes a connection to a URL corresponding to the selected item object (downloads a file that the link represents and executes an application program corresponding to the file).

In the embodiment, the relevance ratio is calculated based on the keyword and the degree of match with the criteria, however, the present invention may calculate the relevance ratio by adjusting for the effect of parameters such as the number of browsing times and the popularity, in addition to the above parameter.

The embodiment has explained, as a preferred embodiment, the mobile phone with a touch panel as an example, however, the present invention is not limited thereto. As explained above, the embodiment can be used for various communication devices. As the communication unit, a communication unit for connecting to a public telecommunication network via a base station, and a communication unit for directly communicating with other terminals are exemplified. As a destination, a server, other terminals, and the like are exemplified.

In the embodiment, a liquid-crystal display device is used as the display device and a touch panel is used as the input device, however, the embodiment is not also limited thereby. For example, a projection display unit such as a projector may be used as the display device, and a touch detector for detecting a touch input to a display area of a projected image may be used as the input device. Specifically, the operator puts his/her hand in the display area, brings the hand to an area where the object is displayed, and moves the hand from that state within the display area. The touch detector detects such operations of the hand, so that the control similar to the above can be provided.

Here, in search refinement, two cases are considered, such as a case (1) where an extracted item object is not desired to be contained in a target group object (hereinafter, it may be called "pre-extraction group object") (where an extracted item object is desired to be removed from the pre-extraction group object), and a case (2) where an extracted item object is desired to be contained in the pre-extraction group object (where an extracted item object is not desired to be removed from the pre-extraction group object).

As an example of the case (1), by referring to, for example, FIG. 6A to FIG. 6E, FIG. 8A to FIG. 8C, and FIG. 10A to FIG. 10B, it is found that the extracted item objects are removed from the pre-extraction group object. This case is suitable for, for example, a case where a plurality of search refinements are sequentially performed on the pre-extraction group object, item objects contained in the pre-extraction group object are gradually decreased, and a desired item object is wished to be found out from the last item objects left in the pre-extraction group object.

Meanwhile, the case (2) is suitable for, for example, a case where a plurality of search refinements are discretely and sequentially performed on the pre-extraction group object.

Figure 13:
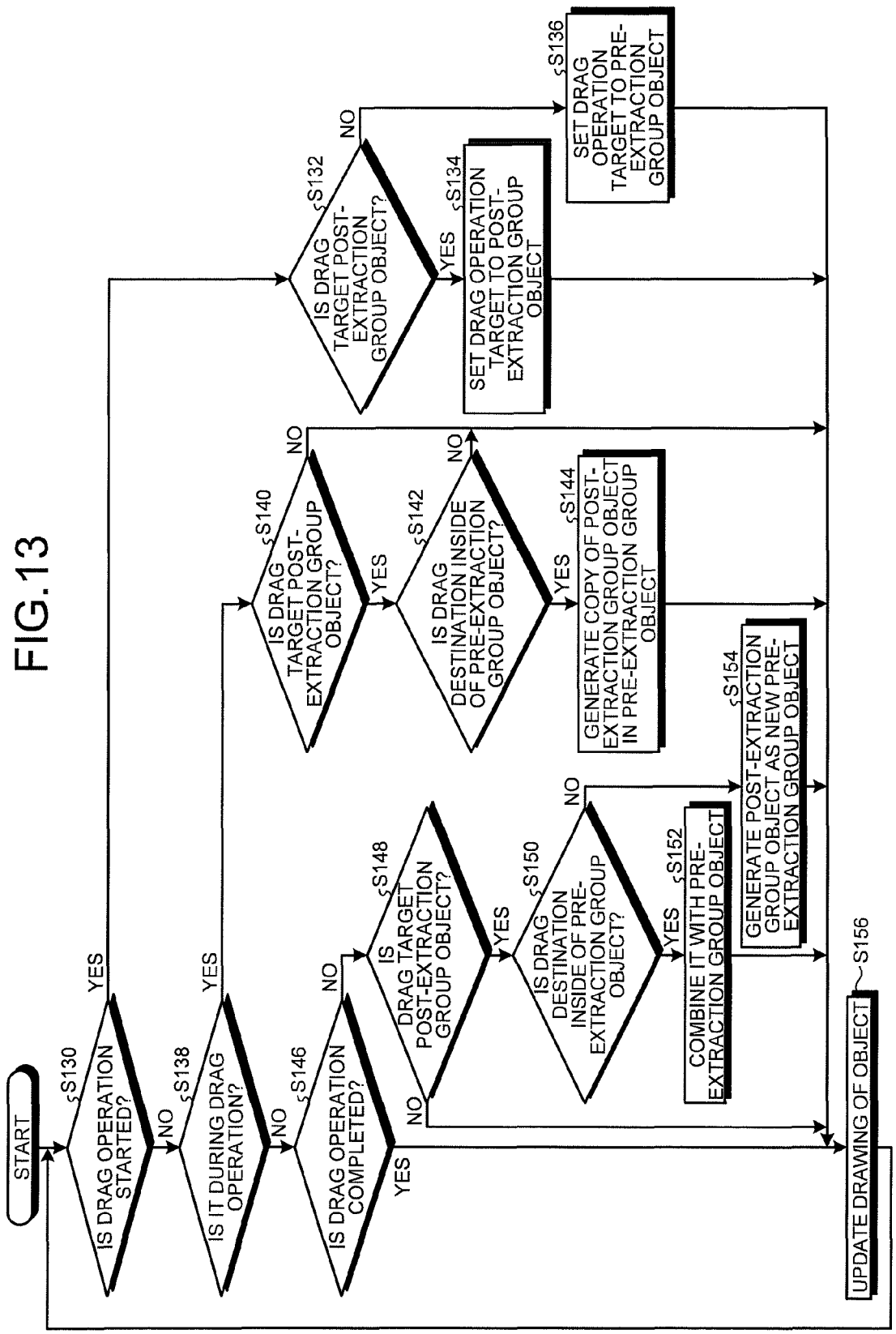
FIG. 13 is a flowchart illustrating one example of the processing operation of the mobile electronic communication device.
Figure 14A:
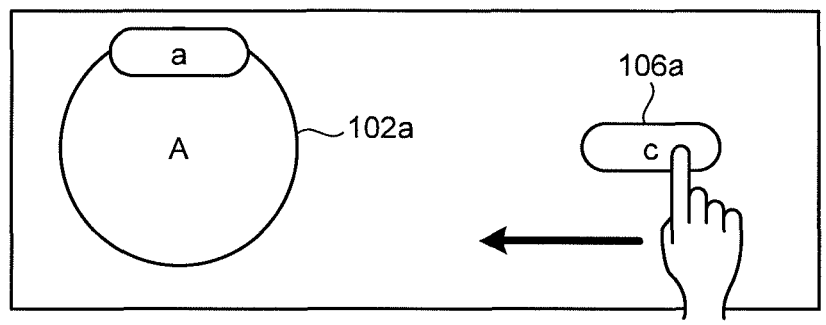
FIG. 14A is an explanatory diagram for explaining an operation of the mobile electronic communication device.
Figure 14B:
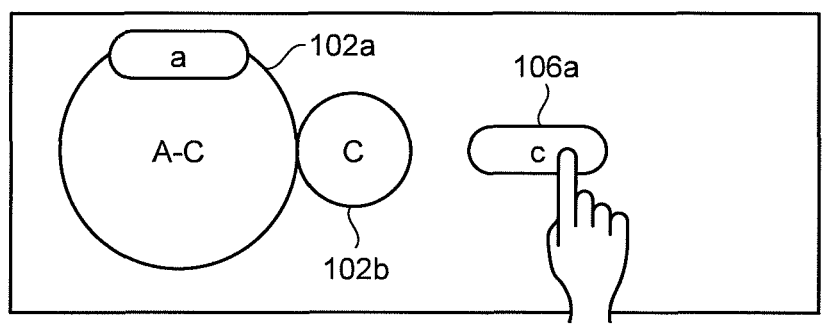
FIG. 14B is an explanatory diagram for explaining the operation of the mobile electronic communication device.
Figure 14C:
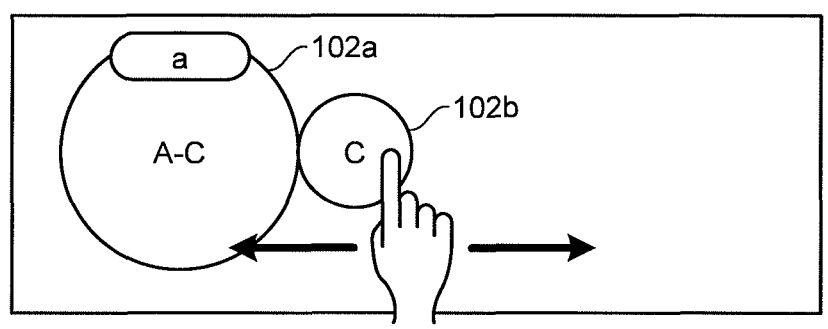
FIG. 14C is an explanatory diagram for explaining the operation of the mobile electronic communication device.
Figure 14D:
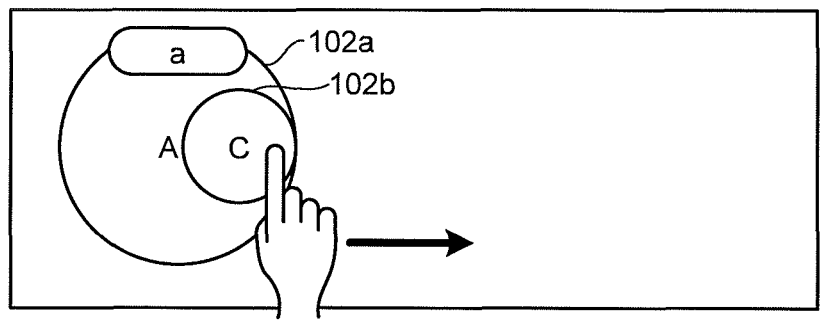
FIG. 14D is an explanatory diagram for explaining the operation of the mobile electronic communication device.
Figure 14E:
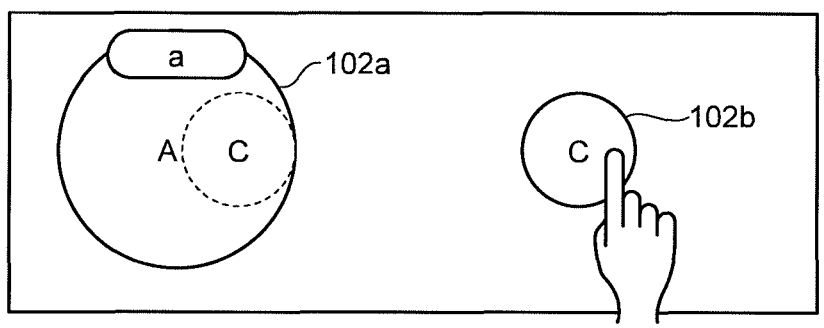
FIG. 14E is an explanatory diagram for explaining the operation of the mobile electronic communication device.
Figure 14F:
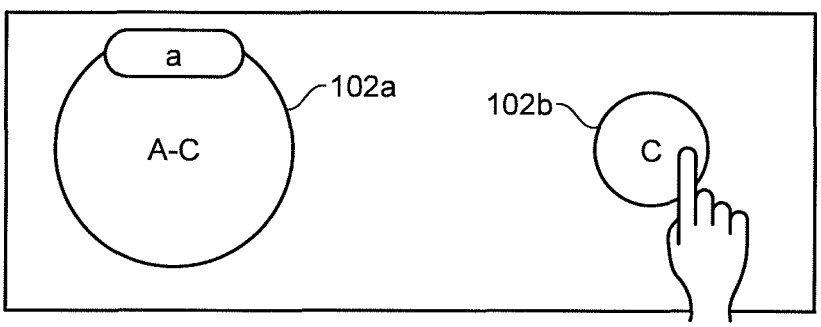
FIG. 14F is an explanatory diagram for explaining the operation of the mobile electronic communication device.

Therefore, in the embodiment illustrated in FIG. 13 to FIG. 14F, it is configured to enable the operator to use the cases (1) and (2) as the situation demands through intuitive and visual operation.

FIG. 13 is a flowchart illustrating one example of the processing operation of the mobile electronic communication device. The processes illustrated in FIG. 13 are executed after the search refinement processes illustrated in the flowcharts of FIG. 4, FIG. 5, FIG. 7A, and FIG. 7B are implemented.

First, the retrieval unit 60 determines whether the drag operation of the pre-extraction group object or of the group object being a group of the extracted item objects (hereinafter, it can be called "post-extraction group object") is started, at Step S130.

When it is determined at Step S130 that the drag operation of the pre-extraction group object or of the post-extraction group object is started (Yes), the retrieval unit 60 determines whether the target of the drag operation is the post-extraction group object, at Step S132. The retrieval unit 60 displays the objects at current positions.

When it is determined at Step S132 that the target of the drag operation is the post-extraction group object (Yes), the retrieval unit 60 sets the target of the drag operation to the post-extraction group object at Step 5134, and thereafter, updates drawing of the group object at Step S156, and returns the process to Step S130. Upon the update of the drawing of the group object, the retrieval unit 60 draws the post-extraction group object at its dragged position, or the like.

When it is determined at Step S132 that the target of the drag operation is not the post-extraction group object (No), the retrieval unit 60 sets the target of the drag operation to the pre-extraction group object at Step S136, and thereafter, updates drawing of the group object at Step S156, and returns the process to Step S130. Upon the update of the drawing of the group object, the retrieval unit 60 draws the pre-extraction group object at its dragged position, or the like.

When it is determined at Step S130 that the drag operation of the pre-extraction group object or of the post-extraction group object is not started (No), the retrieval unit 60 determines whether it is during the drag operation, at Step S138.

When it is determined at Step S138 that it is during the drag operation (Yes), the retrieval unit 60 determines whether the target of the drag operation is the post-extraction group object, at Step S140.

When it is determined at Step S140 that the target of the drag operation is not the post-extraction group object (No), the retrieval unit 60 updates the drawing of the group object at Step S156, and returns the process to Step S130.

When it is determined at Step S140 that the target of the drag operation is the post-extraction group object (Yes), the retrieval unit 60 determines whether a drag destination of the post-extraction group object is the inside of the display area of the pre-extraction group object, at Step S142. As the determination criteria as to whether the drag destination of the post-extraction group object is the inside of the display area of the pre-extraction group object, for example, a determination as to whether the coordinates touched by the operator are the inside of the display area of the pre-extraction group object and a determination as to whether the display area of the post-extraction group object and the display area of the pre-extraction group object overlap each other can be used.

When it is determined at Step S142 that the drag destination of the post-extraction group object is not the inside of the display area of the pre-extraction group object (No), the retrieval unit 60 updates the drawing of the group object at Step S156, and returns the process to Step S130.

When it is determined at Step S142 that the drag destination of the post-extraction group object is the inside of the display area of the pre-extraction group object (Yes), the retrieval unit 60 duplicates (makes a copy of) the item objects in the post-extraction group object in the pre-extraction group object, at Step S144. Thereafter, the retrieval unit 60 updates the drawing of the group object at Step S156, and returns the process to Step S130. In the present embodiment, Step S130 to Step S156 form a loop, and, therefore, when the item objects in the post-extraction group object have already been duplicated in the pre-retrieval group, the retrieval unit 60 does not perform the duplication again.

When it is determined at Step S138 that it is not during the drag operation of the pre-extraction group object or of the post-extraction group object (No), the retrieval unit 60 determines whether the drag operation is completed, at Step S146.

When it is determined at Step S146 that the drag operation is not completed (No), the retrieval unit 60 determines whether the target of the drag operation is the post-extraction group object, at Step S148.

When it is determined at Step S148 that the target of the drag operation is not the post-extraction group object (No), the retrieval unit 60 updates the drawing of the group object at Step S156, and returns the process to Step S130.

When it is determined at Step S148 that the target of the drag operation is the post-extraction group object (Yes), the retrieval unit 60 determines whether the drag destination of the post-extraction group object is the inside of the display area of the pre-extraction group object, at Step S150.

When it is determined at Step S150 that the drag destination of the post-extraction group object is the inside of the display area of the pre-extraction group object (Yes), the retrieval unit 60 combines the post-extraction group object and the pre-extraction group object, at Step S152. With this process, the pre-extraction group object is restored to the state before the search refinement (its original state). When the item objects in the post-extraction group object have been duplicated in the pre-extraction group object, the retrieval unit 60 removes (deletes) the duplicated item objects. Thereafter, the retrieval unit 60 updates the drawing of the group object at Step S156, and returns the process to Step S130.

When it is determined at Step S150 that the drag destination of the post-extraction group object is not the inside of the display area of the pre-extraction group object (No), the retrieval unit 60 generates (fixes) the post-extraction group object as a new pre-extraction group object at Step S154, thereafter updates the drawing of the group object at Step S156, and returns the process to Step S130.

When it is determined at Step S146 that the drag operation is completed (Yes), the retrieval unit 60 updates the drawing of the group object at Step S156, and returns the process to Step S130.

Next, one of the specific operation examples will be explained below with reference to FIG. 14A to FIG. 14F. FIG. 14A to FIG. 14F are explanatory diagrams for explaining operations of the mobile electronic communication device when the operations are performed on the post-extraction group object extracted by the object adsorption A mode. FIG. 14A to FIG. 14F represent one examples of screen display. The explanatory diagrams illustrated in FIG. 14A to FIG. 14F represent one pre-extraction group object and one post-extraction group object only, and do not represent other group objects, item objects contained therein, and key objects. The group of the item objects contained in the pre-extraction group object is indicated by "A".

First, as illustrated in FIG. 14A, when the key object 106a is touched by the operator, the retrieval unit 60 determines that the key object 106a has been selected, and switches to the object adsorption A mode.

Subsequently, when the key object 106a is moved by the operator and a distance between the key object 106a and the group object 102a falls within a certain distance as illustrated in FIG. 14B, the state of the group object 102a is changed to the adsorption mode, and the retrieval unit 60 calculates the relevance ratio of each of the item objects contained in the group object 102a to the search criteria of the key object 106a.

After the calculation of the relevance ratio of each of the item objects, the retrieval unit 60 calculates a range of the relevance ratio of an item object to be adsorbed based on the distance between the key object 106a and the group object 102a. The retrieval unit 60 extracts item objects whose relevance ratio is included in the range of the relevance ratio from among the item objects in the group object 102a based on the result of calculation. Thereafter, as illustrated in FIG. 14B, the retrieval unit 60 moves the group of the extracted item objects (indicated by "C") to the side of the key object 106a, and causes the group to be adsorbed to the key object 106a.

Subsequently, when the operator takes his/her hand off the input device 34 and releases the drag state, which is the untouched state of the input device 34, the retrieval unit 60 fixes item objects to be extracted (adsorbed). That is, the range of the relevance ratio of item objects to be extracted is fixed, and the item objects satisfying the range of the relevance ratio are extracted. The group of the extracted item objects becomes a new group object (post-extraction group object) 102b.

As illustrated in FIG. 14C, when the operator touches the post-extraction group object 102b and drags the post-extraction group object 102b to the inside of the display area of the pre-extraction group object 102a as illustrated in FIG. 14D, the group "C" of the item objects contained in the post-extraction group object 102b is duplicated (copied) in the pre-extraction group object 102a. Thereafter, as illustrated in FIG. 14E, when the operator drags the post-extraction group object 102b to the outside of the display area of the pre-extraction group object 102a, the group "C" of the extracted item objects is contained in both the pre-extraction group object 102a and the post-extraction group object 102b.

Meanwhile, in FIG. 14F, when the operator touches the post-extraction group object 102b and drags the post-extraction group object 102b in a direction away from the display area of the pre-extraction group object 102a without being dragged to the inside of the display area of the pre-extraction group object 102a, the group "C" of the item objects contained in the post-extraction group object 102b is not duplicated (copied) in the pre-extraction group object 102a. That is, a group "A-C" of the item objects is contained in the pre-extraction group object 102a.

Here, the case where the operation is performed on the post-extraction group object extracted by the object adsorption A mode has been explained, however, the same operation can be also applied to the post-extraction group object extracted by the object adsorption B mode.

In this manner, the mobile electronic communication device 10 determines whether the extracted item object is contained in the pre-extraction group object based on the movement direction of the post-extraction group object, so that the operator can perform an operation as to whether an intuitively and visually extracted item object is contained in the pre-extraction group object. This also enables to improve the handling operability for the pre-extraction group object after the search refinement is performed on the pre-extraction group object, which enables the operator to easily obtain his/her desired search result. For example, the operability of the case where a plurality of search refinements are discretely and sequentially performed on the pre-extraction group object can be improved.

The present embodiment represents the example in which when it is detected that the post-extraction group object is moved to the inside of the display area of the pre-extraction group object and is then moved to the outside of the display area of the pre-extraction group object, the extracted item object is duplicated (copied), however, the present invention is not limited thereto. For example, it may be configured that the extracted item object can be referred to from both the post-extraction group object and the pre-extraction group object without duplicating (copying) the extracted item object, so that the extracted item object is contained (displayed) in both the post-extraction group object and the pre-extraction group object.

The present embodiment represents the example in which when it is detected that the whole of the post-extraction group object is moved to the inside of the display area of the pre-extraction group object and is then moved to the outside of the display area of the pre-extraction group object, the extracted item object is contained (displayed) in both the post-extraction group object and the pre-extraction group object, however, the present invention is not limited thereto. For example, it may be configured that when it is detected that part of the post-extraction group object is moved to the inside of the display area of the pre-extraction group object and is then moved to the outside of the display area of the pre-extraction group object, the extracted item object is contained (displayed) in both the post-extraction group object and the pre-extraction group object.

The mobile electronic communication device 10 according to the present embodiment can be applied to any mobile electronic device that is equipped with a WEB browser capable of displaying a WEB page and displays an image corresponding to a WEB page search result on the display device using the WEB browser. In this case, the item object is an image representing a URL. The group object is an image surrounding a URL group extracted through retrieval. When these images are displayed on the display device and if an area with one item object displayed therein is touched and selected, the mobile electronic device acquires a WEB page specified by the URL corresponding to the selected item object through the communication unit, and displays the acquired WEB page on the display device.

In the embodiments, one key object is used to perform retrieval in any case, however, the present invention is not limited thereto.

As for the search refinement, there may be a case where an item object that matches the results of logical operations (e.g., AND operation, OR operation, NAND operation, NOR operation, and XOR (exclusive OR) operation) performed on a plurality of key objects is desired to be obtained.

On the other hand, the mobile electronic communication device 10 may be configured to create a search key box object in which search criteria obtained in combination with a plurality of key objects are set and to perform the search refinement. The search refinement using the search key box object will be explained below. In the mobile electronic communication device 10 according to the present embodiment, the information for the search key box object is stored in the object information database 78 and so on. In the present embodiment, by using the search key box object, the item object that matches the results of logical operations performed on the key objects can be obtained through intuitive and visual operation.

The present embodiment is configured to provide and display a search key box object 108 capable of containing a plurality of key objects, perform logical operations on the key objects contained in the search key box object 108, and to extract an item object that matches the results of the logical operations from the group object 102.

Figure 16:
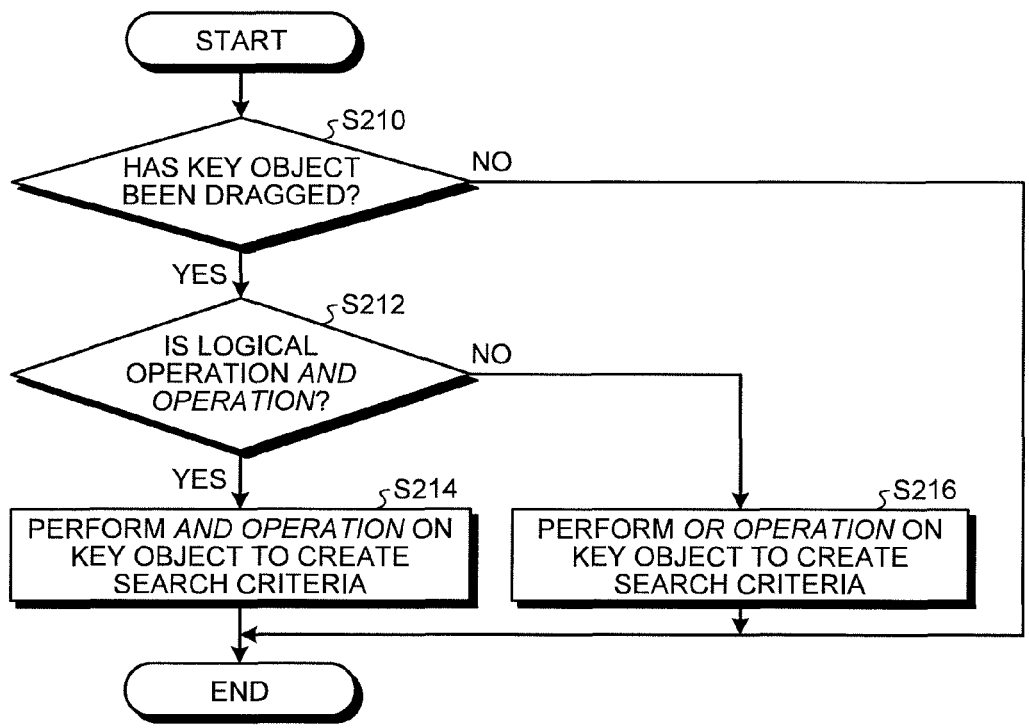
FIG. 16 is a flowchart illustrating one example of the processing operation of the mobile electronic communication device.

FIG. 16 is a flowchart illustrating one example of a processing operation of the mobile electronic communication device when a key object is added (contained in) to the search key box object 108.

Here, cases where the AND operation and the OR operation are used as the logical operations are explained for convenience, however, as explained above, the other logical operations (e.g., NAND operation, NOR operation, and XOR operation) can also be used.

First, the retrieval unit 60 determines whether the key object 106 has been dragged, at Step S210. As the determination criteria as to whether the drag destination of the key object is the inside of the display area of the search key box object, for example, a case of whether the coordinates touched by the operator are the inside of the display area of the search key box object, a case of whether the display area of the search key box object and the display area of the dragged key object overlap each other, or some other case can be used.

When it is determined at Step S210 that the key object 106 has been dragged (Yes), the retrieval unit 60 determines, at Step S212, whether the logical operation (for example, the logical operation may be set as default, or the logical operation may be selected by the operator as explained later) currently set in the search key box object 108 is the AND operation.

When it is determined at Step S212 that the logical operation currently set in the search key box object 108 is the AND operation (Yes), the retrieval unit 60 performs the AND operation on the key objects 106 currently contained in the search key box object 108, at Step S214, to create search criteria. The created search criteria may be stored in the object information database 78 (see FIG. 2). If one key object 106 is currently contained in the search key box object 108, the retrieval unit 60 may skip Step S214 without executing this step. When the search criteria created by performing the AND operation on the key objects 106 currently contained in the search key box object 108 are already stored in the object information database 78, the retrieval unit 60 may skip Step S214 without executing this step. Furthermore, the search key box object 108 may be displayed in a predetermined color (e.g., red) so that the operator can visually and intuitively recognize that the logical operation currently set in the search key box object 108 is the AND operation.

When it is determined at Step S212 that the logical operation currently set in the search key box object 108 is not the AND operation (No), the retrieval unit 60 performs the OR operation on the key objects 106 currently contained in the search key box object 108, at Step S216, to create search criteria. The created search criteria may be stored in the object information database 78 (see FIG. 2). If one key object 106 is currently contained in the search key box object 108, the retrieval unit 60 may skip Step S216 without executing this step. When the search criteria created by performing the OR operation on the key objects 106 currently contained in the search key box object 108 are already stored in the object information database 78, the retrieval unit 60 may skip Step S216 without executing this step. Furthermore, the search key box object 108 may be displayed in a predetermined color (e.g., yellow) so that the operator can visually and intuitively recognize that the logical operation currently set in the search key box object 108 is the OR operation.

Next, one of the specific operation examples will be explained below with reference to FIG. 17A to FIG. 17D. FIG. 17A to FIG. 17D are explanatory diagrams for explaining operations of the mobile electronic communication device when the operations of adding (containing) the key object 106 to (in) the search key box object 108 are performed. FIG. 17A to FIG. 17D represent one examples of screen display. The explanatory diagrams illustrated in FIG. 17A to FIG. 17D represent one search key box object 108 and three key objects 106 only, and do not represent other group objects, item objects contained therein, key objects, and search key box objects. Moreover, it is assumed that the AND operation as the logical operation is set in the search key box object 108 and there is no key object contained therein.

Figure 17A:
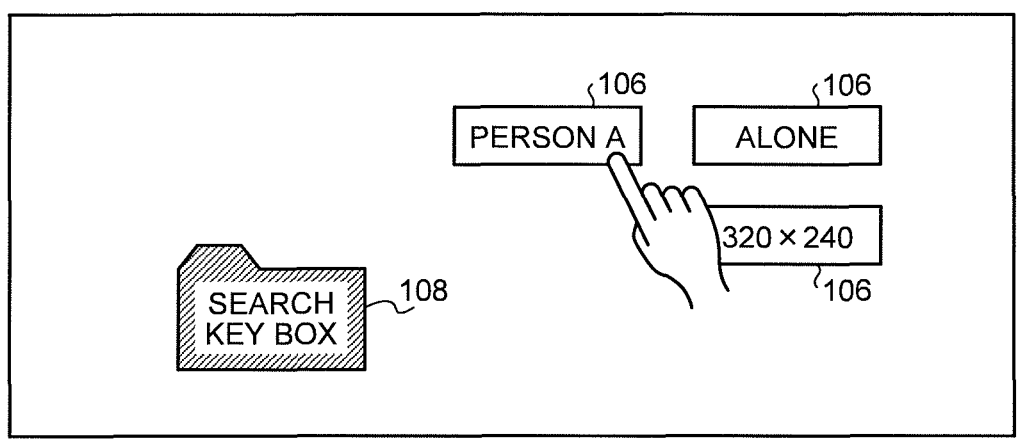
FIG. 17A is an explanatory diagram for explaining an operation of the mobile electronic communication device.
Figure 17B:
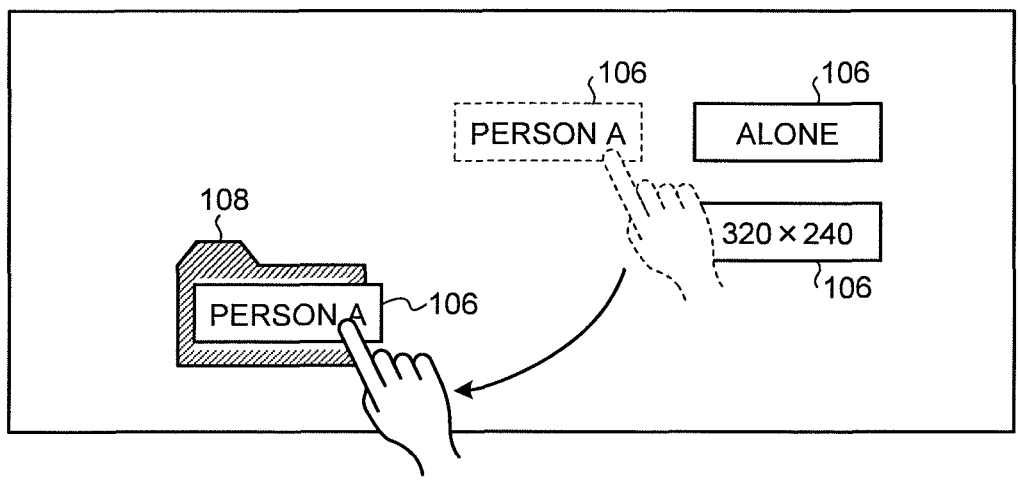
FIG. 17B is an explanatory diagram for explaining the operation of the mobile electronic communication device.

First, when the key object 106 "Person A" is moved by the operator as illustrated in FIG. 17A and the key object 106 "Person A" enters the display area of the search key box object 108 as illustrated in FIG. 17B, the key object 106 "Person A" is contained in the search key box object 108.

Figure 17C:
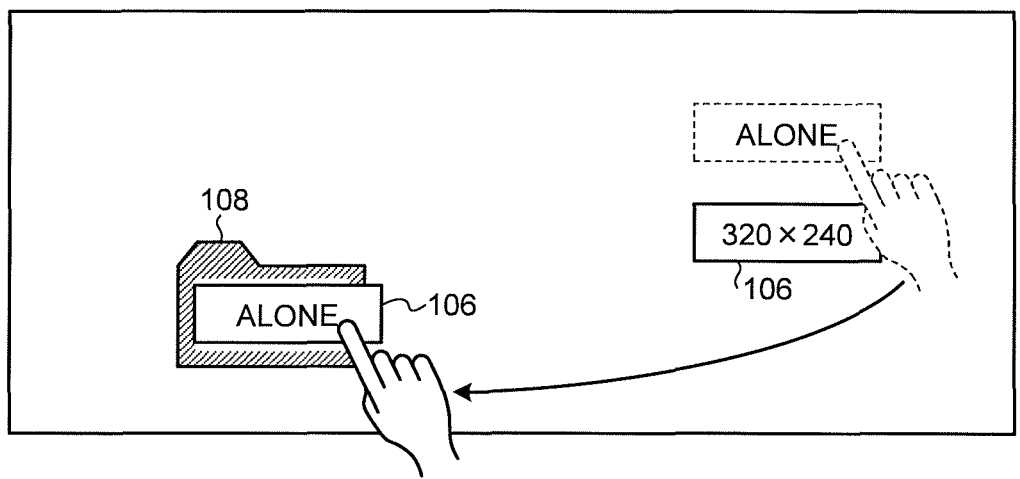
FIG. 17C is an explanatory diagram for explaining the operation of the mobile electronic communication device.

Subsequently, as illustrated in FIG. 17C, when the key object 106 "Alone" is moved by the operator and the key object 106 "Alone" enters the display area of the search key box object 108, the key object 106 "Alone" is contained in the search key box object 108. The retrieval unit 60 then performs the AND operation on the key object 106 "Person A" and the key object 106 "Alone", to create search criteria.

Figure 17D:
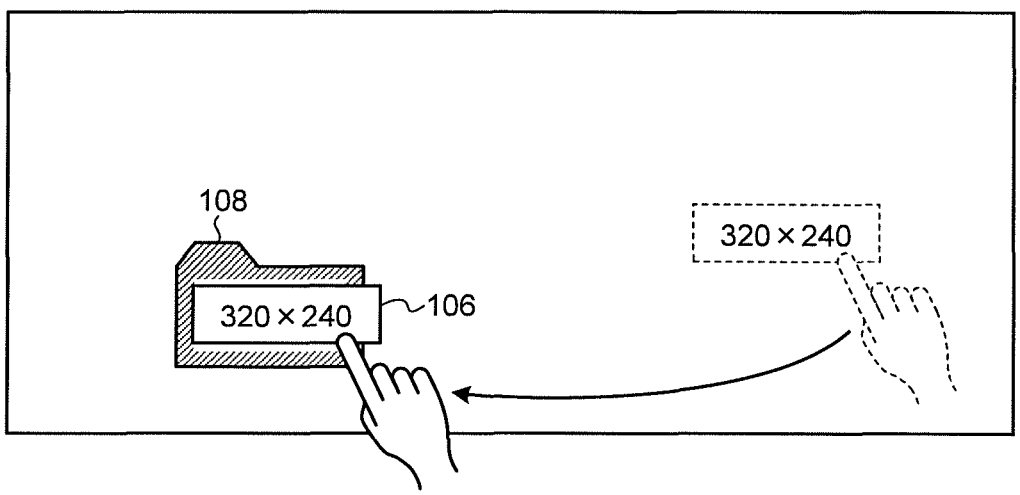
FIG. 17D is an explanatory diagram for explaining the operation of the mobile electronic communication device.

Furthermore, as illustrated in FIG. 17D, when the key object 106 "320×240" (image size) is moved by the operator and the key object 106 "320×240" enters the display area of the search key box object 108, the key object 106 "320×240" is contained in the search key box object 108. The retrieval unit 60 then performs the AND operation on the key object 106 "Person A", the key object 106 "Alone", and the key object 106 "320×240", to create search criteria.

Figure 18:
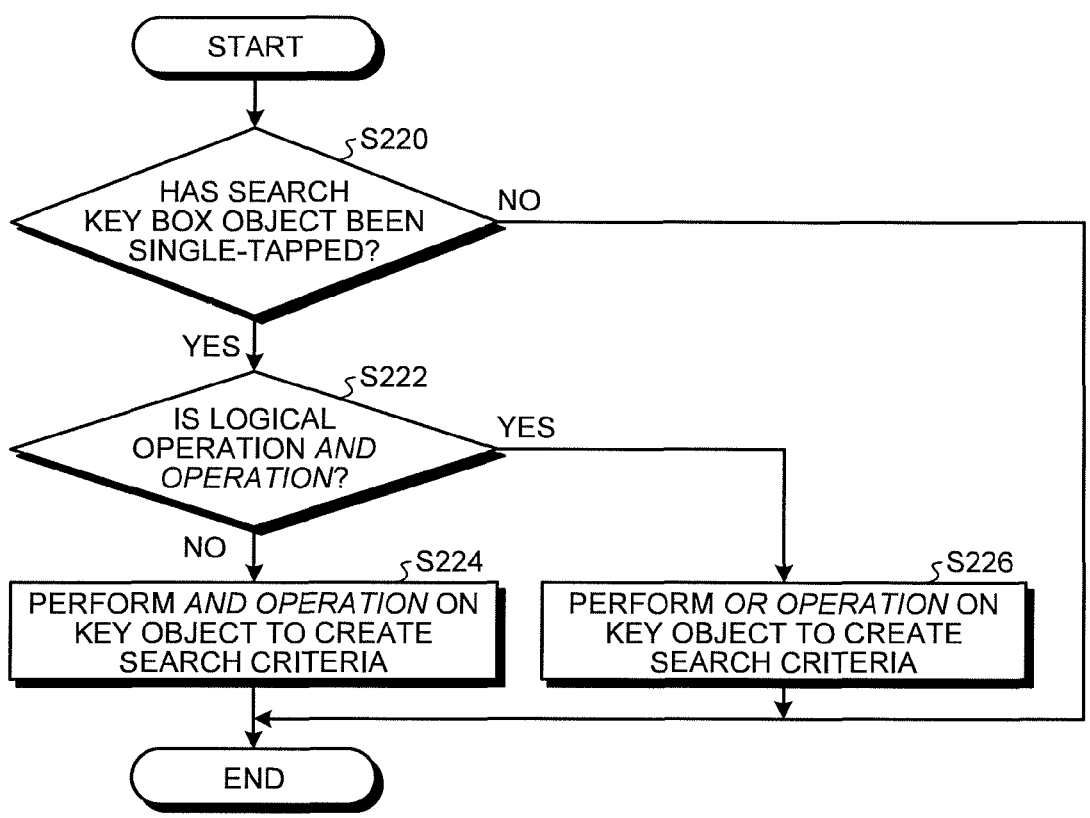
FIG. 18 is a flowchart illustrating one example of the processing operation of the mobile electronic communication device.

FIG. 18 is a flowchart illustrating one example of the processing operation of the mobile electronic communication device when the logical operation set in the search key box object 108 is changed.

Here, cases where the AND operation and the OR operation are used as the logical operations are explained for convenience, however, as explained above, the other logical operations (e.g., NAND operation, NOR operation, and XOR operation) may also be used. That is, various operation expressions can be used as an operation expression used for theoretical operation.

First, the retrieval unit 60 determines whether the search key box object 108 has been single-tapped, at Step S220.

When it is determined at Step S220 that the search key box object 108 has been single-tapped (Yes), the retrieval unit 60 determines whether the logical operation currently set in the search key box object 108 is the AND operation, at Step S222.

When it is determined at Step S222 that the logical operation currently set in the search key box object 108 is not the AND operation (No), the retrieval unit 60 performs the AND operation on the key objects 106 currently contained in the search key box object 108, at Step S224, to create search criteria. The created search criteria may be stored in the object information database 78 (see FIG. 2). If one key object 106 is currently contained in the search key box object 108, the retrieval unit 60 may skip Step S224 without executing this step. When the search criteria created by performing the AND operation on the key objects 106 currently contained in the search key box object 108 are already stored in the object information database 78, the retrieval unit 60 may skip Step S224 without executing this step. Furthermore, the search key box object 108 may be displayed in a predetermined color (e.g., red) so that the operator can visually and intuitively recognize that the logical operation currently set in the search key box object 108 is the AND operation.

When it is determined at Step S222 that the logical operation currently set in the search key box object 108 is the AND operation (Yes), the retrieval unit 60 performs the OR operation on the key objects 106 currently contained in the search key box object 108, at Step S226, to create search criteria. The created search criteria may be stored in the object information database 78 (see FIG. 2). If one key object 106 is currently contained in the search key box object 108, the retrieval unit 60 may skip Step S226 without executing this step. When the search criteria created by performing the OR operation on the key objects 106 currently contained in the search key box object 108 are already stored in the object information database 78, the retrieval unit 60 may skip Step S226 without executing this step. Furthermore, the search key box object 108 may be displayed in a predetermined color (e.g., yellow) so that the operator can visually and intuitively recognize that the logical operation currently set in the search key box object 108 is the OR operation.

Next, one of the specific operation examples will be explained below with reference to FIG. 19A to FIG. 19D. FIG. 19A to FIG. 19D are explanatory diagrams for explaining operations of the mobile electronic communication device when the operations of changing the logical operation set in the search key box object 108 are performed. FIG. 19A to FIG. 19D represent one examples of screen display. The explanatory diagrams illustrated in FIG. 19A to FIG. 19D represent one search key box object 108 only, and do not represent other group objects, item objects contained therein, key objects, and search key box objects. Moreover, it is assumed that the logical operation currently set in the search key box object 108 is the AND operation and the search key box object 108 is displayed in red.

Figure 19A:
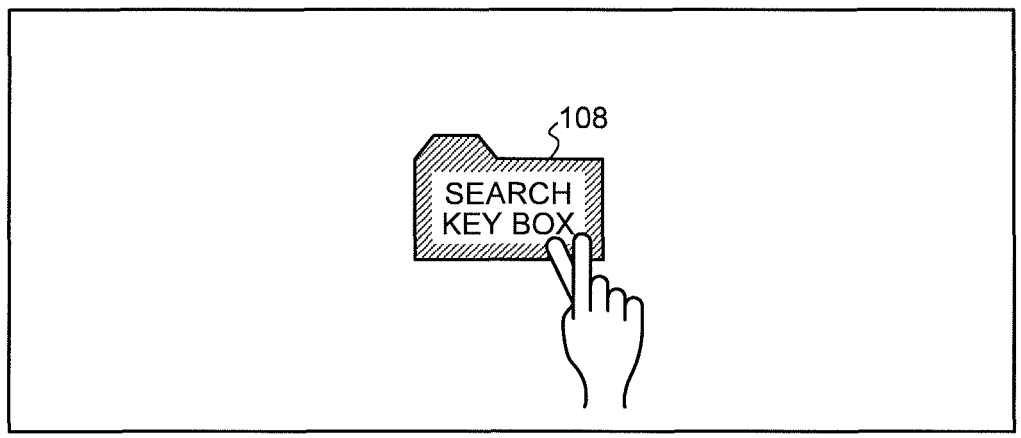
FIG. 19A is an explanatory diagram for explaining an operation of the mobile electronic communication device.
Figure 19B:
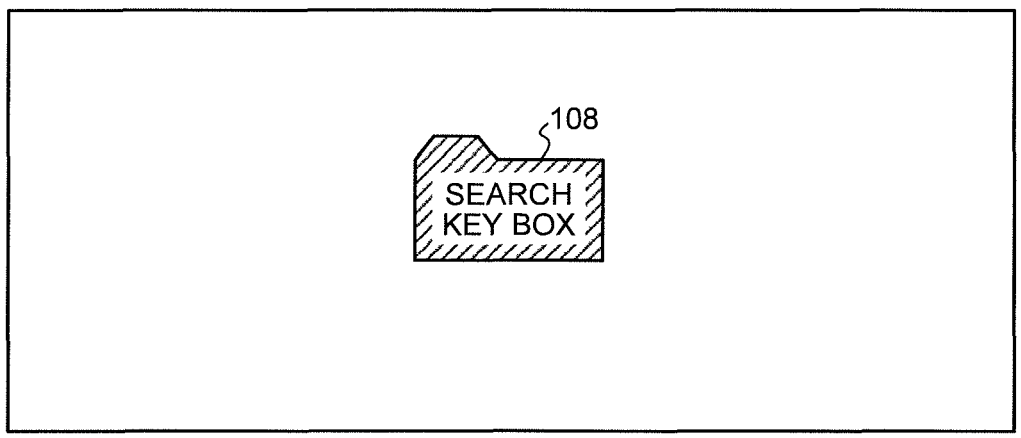
FIG. 19B is an explanatory diagram for explaining the operation of the mobile electronic communication device.

First, if the search key box object 108 is single-tapped by the operator, as illustrated in FIG. 19A, when the logical operation currently set in the search key box object 108 is the AND operation, the retrieval unit 60 sets the OR operation as the logical operation in the search key box object 108. Thereafter, the retrieval unit 60 performs the OR operation on the key objects 106 currently contained in the search key box object 108, to create search criteria. When the search criteria created by performing the OR operation on the key objects 106 currently contained in the search key box object 108 are already stored in the object information database 78, the retrieval unit 60 does not have to perform the OR operation. In addition, as illustrated in FIG. 19B, the retrieval unit 60 displays the search key box object 108 in a predetermined color (e.g., yellow) so that the operator can visually and intuitively recognize that the logical operation currently set in the search key box object 108 is the OR operation.

Figure 19C:
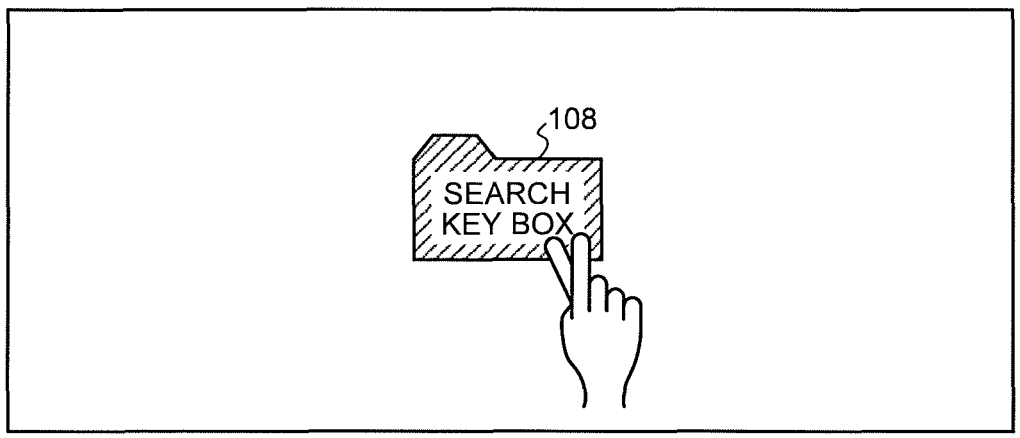
FIG. 19C is an explanatory diagram for explaining the operation of the mobile electronic communication device.
Figure 19D:
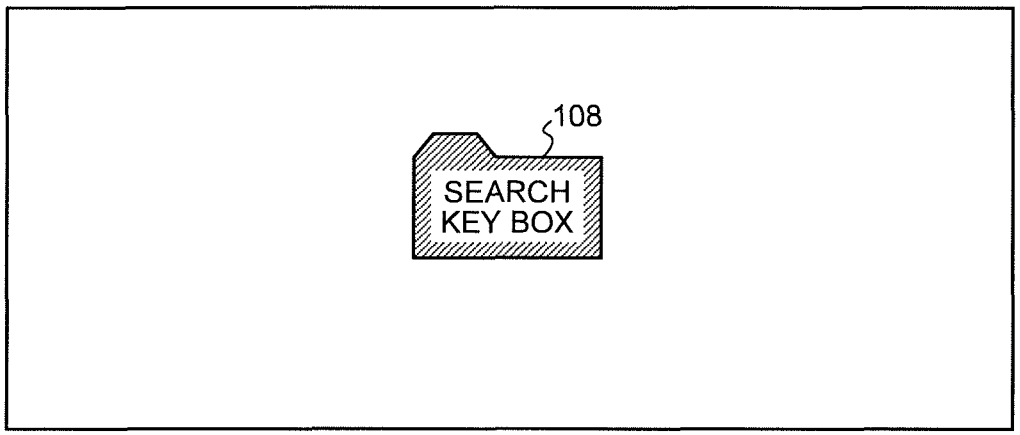
FIG. 19D is an explanatory diagram for explaining the operation of the mobile electronic communication device.

Subsequently, if the search key box object 108 is single-tapped by the operator, as illustrated in FIG. 19C, when the logical operation currently set in the search key box object 108 is the OR operation, the retrieval unit 60 sets the AND operation as the logical operation in the search key box object 108. Thereafter, the retrieval unit 60 performs the AND operation on the key objects 106 currently contained in the search key box object 108, to create search criteria. When the search criteria created by performing the AND operation on the key objects 106 currently contained in the search key box object 108 are already stored in the object information database 78, the retrieval unit 60 does not have to perform the AND operation. In addition, as illustrated in FIG. 19D, the retrieval unit 60 displays the search key box object 108 in a predetermined color (e.g., red) so that the operator can visually and intuitively recognize that the logical operation currently set in the search key box object 108 is the AND operation.

Here, the cases where the AND operation and the OR operation are used as operation expressions for use in logical operations have been explained, however, as explained above, the other logical operations (e.g., NAND operation, NOR operation, and XOR operation) may be used to switch between the operational expressions. For example, the logical operation set in the search key box object 108 may be changed, each time the search key box object 108 is single-tapped, in such a manner as AND operation→OR operation→NAND operation→NOR operation→XOR operation→ . . . . The logical operation set in the search key box object 108 may also be changed according to the number of times (double tap, triple tap, and so on) at which the search key box object 108 is tapped.

Figure 20:
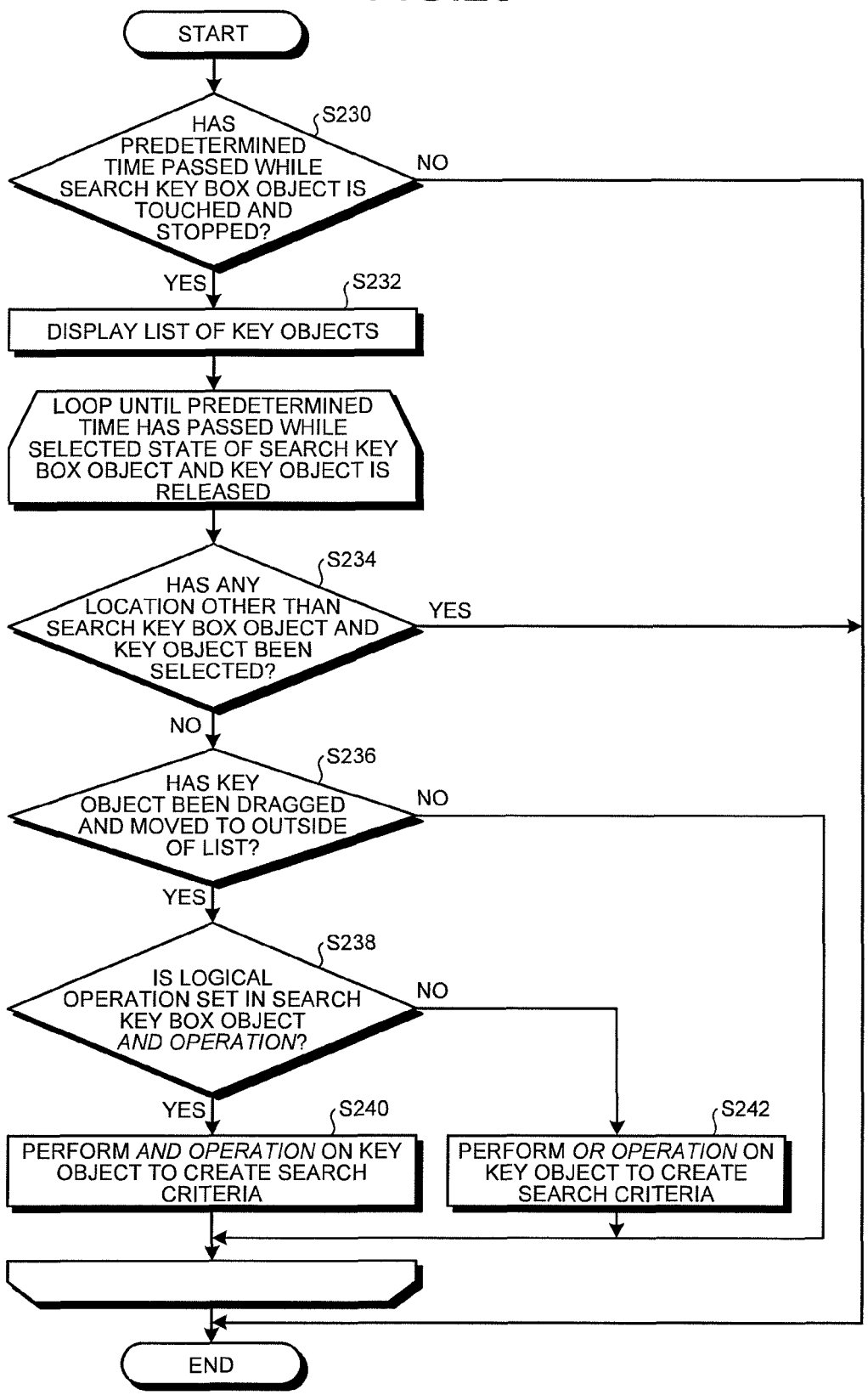
FIG. 20 is a flowchart illustrating one example of the processing operation of the mobile electronic communication device.

FIG. 20 is a flowchart illustrating one example of the processing operation of the mobile electronic communication device when the key object contained in the search key box object 108 is removed (so as not to be contained therein).

First, the retrieval unit 60 determines whether a predetermined time has passed while the search key box object 108 is touched and stopped (tap and hold). When it is determined at Step S230 that the predetermined time has not passed while the search key box object 108 is touched and stopped (No), the retrieval unit 60 ends the process.

When it is determined at Step S230 that the predetermined time has passed while the search key box object 108 is touched and stopped (Yes), the retrieval unit 60 displays a list of the key objects 106 contained in the search key box object 108, at Step S232. Even if the touch is released in such a state, list display is not ended until the condition of ending the list display is satisfied.

The retrieval unit 60 determines whether any location other than the search key box object 108 and the key objects 106 displayed as a list has been selected (touched), at Step S234. When it is determined at Step S234 that any location other than the search key box object 108 and the key objects 106 displayed as a list has been selected (Yes), the retrieval unit 60 ends the process.

When it is determined at Step S234 that any location other than the search key box object 108 and the key objects 106 displayed as a list has not been selected (touched) (No), the retrieval unit 60 determines whether the key object 106 has been dragged and moved to the outside of the list display area, at Step S236. When it is determined at Step S236 that the key object 106 has not been dragged so as to be moved to the outside of the list display area (No), the retrieval unit 60 ends the process.

When it is determined at Step S236 that the key object 106 has been dragged and moved to the outside of the list display area (Yes), at Step S238, the retrieval unit 60 removes (does not contain) the key object 106 dragged and moved to the outside of the list display area from (in) the search key box object 108, and determines whether the logical operation currently set in the search key box object 108 is the AND operation.

When it is determined at Step S238 that the logical operation currently set in the search key box object 108 is the AND operation (Yes), the retrieval unit 60 performs the AND operation on the key objects 106 currently contained in the search key box object 108, at Step S240, to create search criteria. The created search criteria may be stored in the object information database 78 (see FIG. 2). If one key object 106 is currently contained in the search key box object 108, the retrieval unit 60 may skip Step S240 without executing this step. When the search criteria created by performing the AND operation on the key objects 106 currently contained in the search key box object 108 are already stored in the object information database 78, the retrieval unit 60 may skip Step S240 without executing this step.

When it is determined at Step S238 that the logical operation currently set in the search key box object 108 is not the AND operation (No), the retrieval unit 60 performs the OR operation on the key objects 106 currently contained in the search key box object 108, at Step S242, to create search criteria. The created search criteria may be stored in the object information database 78 (see FIG. 2). If one key object 106 is currently contained in the search key box object 108, the retrieval unit 60 may skip Step S242 without executing this step. When the search criteria created by performing the OR operation on the key objects 106 currently contained in the search key box object 108 are already stored in the object information database 78, the retrieval unit 60 may skip Step S242 without executing this step. Furthermore, the search key box object 108 may be displayed in a predetermined color (e.g., yellow) so that the operator can visually and intuitively recognize that the logical operation currently set in the search key box object 108 is the OR operation.

The retrieval unit 60 repeats the processes from Step S234 to Step S242 until the predetermined time has passed while the selected state of the search key box object 108 and the list of the key objects is released.

Next, one of the specific operation examples will be explained below with reference to FIG. 21A to FIG. 21D. FIG. 21A to FIG. 21D are explanatory diagrams for explaining operations of the mobile electronic communication device when the operations of removing (not containing) the key objects contained in the search key box object 108 are performed. FIG. 21A to FIG. 21D represent one examples of screen display. The explanatory diagrams illustrated in FIG. 21A to FIG. 21D represent one search key box object 108 only, and do not represent other group objects, item objects contained therein, key objects, and search key box objects. Moreover, it is assumed that the logical operation currently set in the search key box object 108 is the AND operation and the search key box object 108 is displayed in a predetermined color (e.g., red).

Figure 21A:
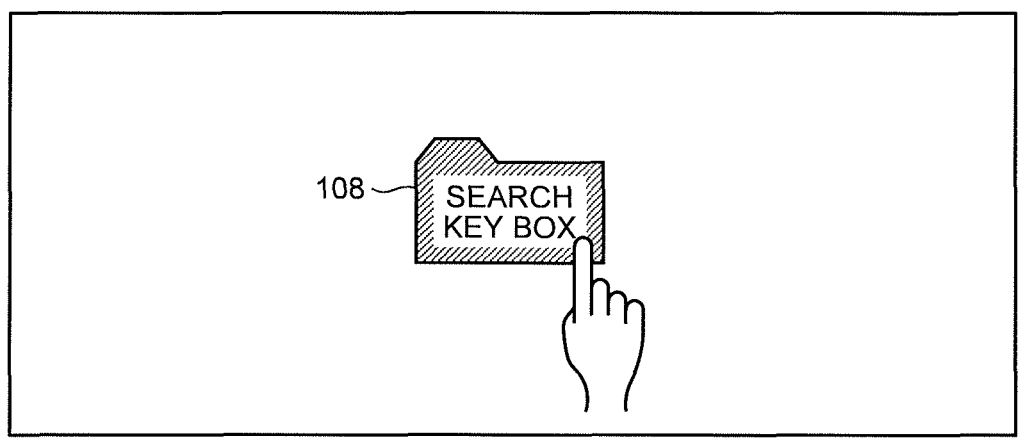
FIG. 21A is an explanatory diagram for explaining an operation of the mobile electronic communication device.
Figure 21B:
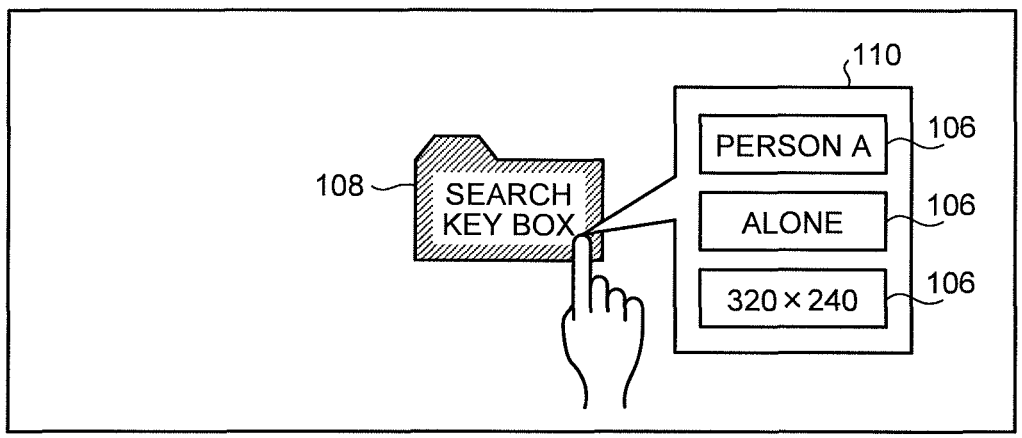
FIG. 21B is an explanatory diagram for explaining the operation of the mobile electronic communication device.

First, as illustrated in FIG. 21A, when a predetermined time has passed while the search key box object 108 is touched by the operator and is stopped (tap and hold), a list box 110 is displayed near the search key box object 108, as illustrated in FIG. 21B. The key objects 106 contained in the search key box object 108 are displayed as a list inside the list box 110. In FIG. 21B, the three key objects such as the key object 106 "Person A", the key object 106 "Alone", and the key object 106 "320×240" are displayed inside the list box 110.

Figure 21C:
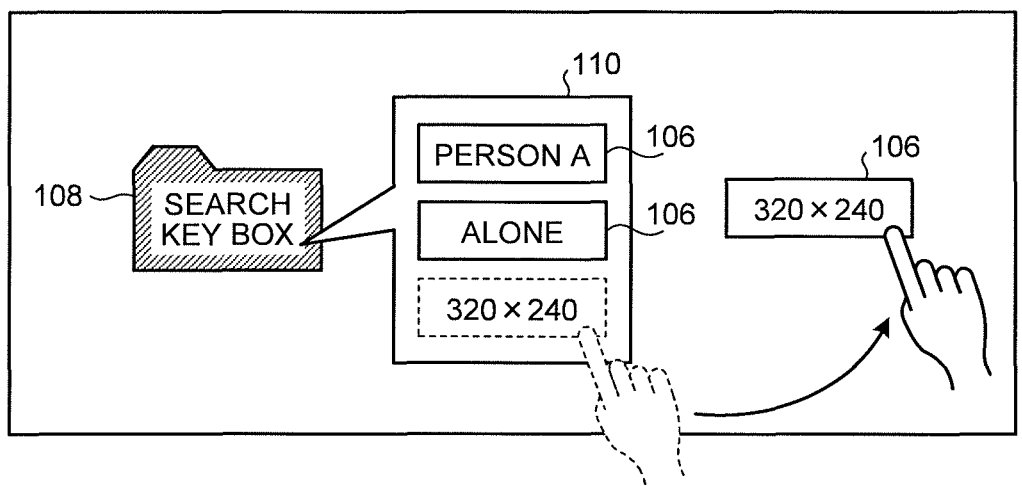
FIG. 21C is an explanatory diagram for explaining the operation of the mobile electronic communication device.

Subsequently, as illustrated in FIG. 21C, when the key object 106 "320×240" is dragged by the operator to be moved to the outside of the list box 110, the retrieval unit 60 removes (does not contain) the key object 106 "320×240" from (in) the search key box object 108, and performs the AND operation on the key objects 106 contained in the search key box object 108, to create search criteria. When the search criteria created by performing the AND operation on the key objects 106 currently contained in the search key box object 108 are already stored in the object information database 78, the retrieval unit 60 does not have to perform the AND operation.

Figure 21D:
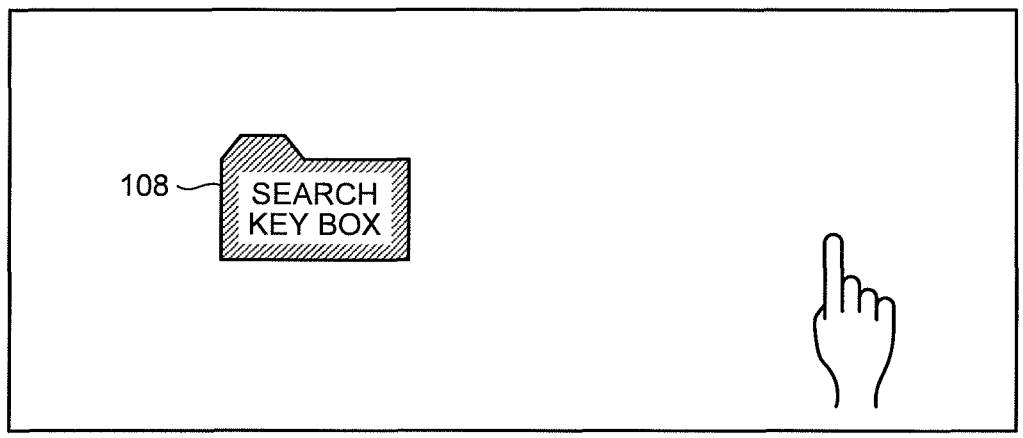
FIG. 21D is an explanatory diagram for explaining the operation of the mobile electronic communication device.

Subsequently, when the predetermined time has passed while the selected states of the search key box object 108 and the list of the key objects are released, or, as illustrated in FIG. 21D, when any location other than the search key box object 108 and the list box 110 is touched by the operator, the retrieval unit 60 erase the list box 110 (the display of the list box 110 is ended).

For example, in FIG. 17A to FIG. 17D and FIG. 21A to FIG. 21D, it may be configured that if the operator double-taps the search key box object 108 or the list box 110, the state of the search key box object 108 is returned to the previous state (for example, in the case of adding the key object, the addition is canceled, and in the case of deleting the key object, the deletion is canceled).

The mobile electronic communication device 10 uses the search key box object created in the above manner to perform search refinement using the same method as the search refinement performed by using the key object, and thereby enables to perform search refinement under the search criteria in which a plurality of search criteria set in the search key box object are combined.

Figure 15:
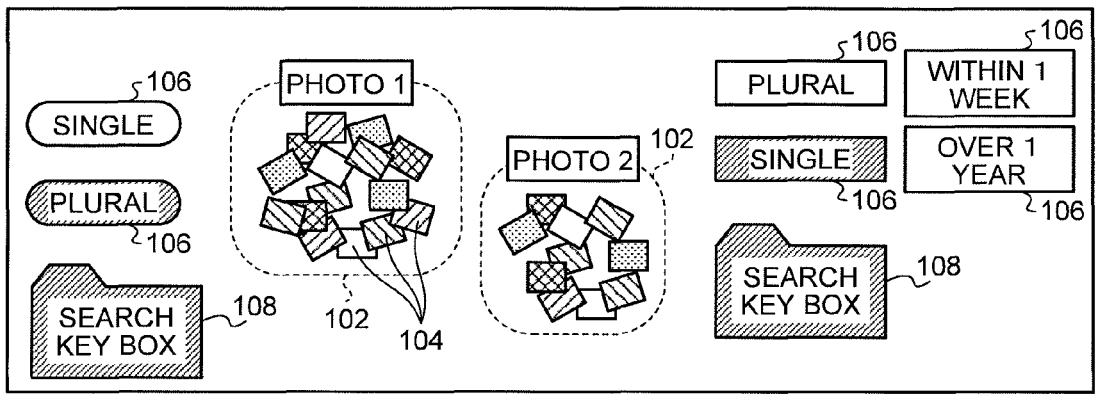
FIG. 15 is an explanatory diagram illustrating one example of an image displayed on the display device.

As one example, when the units of software illustrated in FIG. 2 are activated, as illustrated in FIG. 15, the group objects each containing a plurality of item objects, a plurality of key objects, and a plurality of search key box objects are displayed on the screen of the display device 32. When the group objects each containing the item objects, the key objects, and the search key box objects are displayed in this manner, the search refinement is performed at the time of performing a predetermined operation. Two types of key objects such as A-mode key object and B-mode key object are displayed in a plurality pieces each. Likewise, as the search key box object, two search key box objects such as A-mode search key box object and B-mode search key box object are displayed. The A mode and the B mode are methods of calculating the range (threshold) of relevance ratio of an extracted item object determined based on the operation of the key object. In the case of the search key box object, the range (threshold) of relevance ratio can be determined in the same manner as above. Therefore, when the search key box object is used instead of the key object, it is also possible to perform search refinement through the processes in the flowcharts illustrated in FIG. 4, FIG. 5, FIG. 7A, and FIG. 7B, respectively. When the search key box object is used, the criteria of refinement are those in which a plurality of key objects contained in the search key box object are combined with each other.

Next, one of the specific operation examples will be explained below with reference to FIG. 22A to FIG. 22D. FIG. 22A to FIG. 22D are explanatory diagrams for explaining operations of the mobile electronic communication device when each of the operations is performed in the object adsorption A mode. FIG. 22A to FIG. 22D represent one examples of screen display. The explanatory diagrams illustrated in FIG. 22A to FIG. 22D represent one group object and item objects contained therein and one A-mode search key box object only, and do not represent other group objects, item objects contained therein, key objects, and search key box objects. Moreover, it is assumed that three key objects such as the key object 106 "Person A", the key object 106 "Alone", and the key object 106 "320×240" are contained in the A-mode search key box object and the AND operation is set as the logical operation.

First, when the area corresponding to an A-mode search key box object 108a is touched by the operator, the retrieval unit 60 determines that the A-mode search key box object 108a has been selected, and switches to the object adsorption A mode.

Figure 22A:
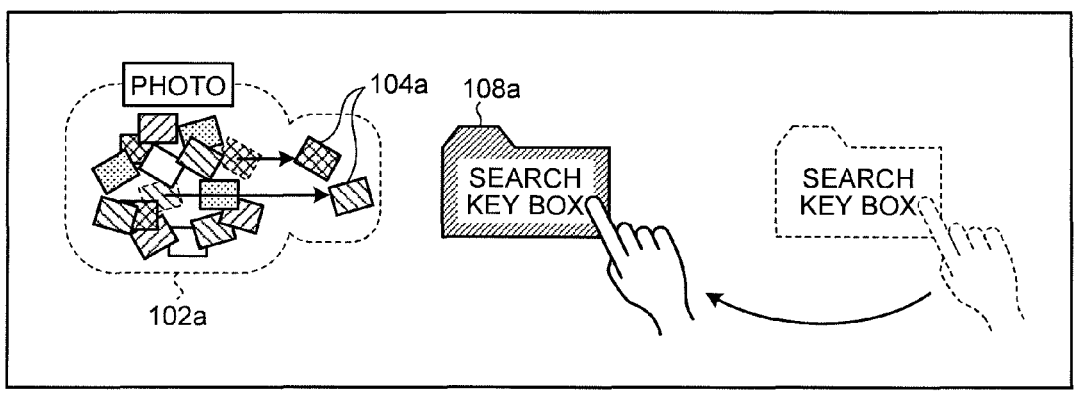
FIG. 22A is an explanatory diagram for explaining an operation of the mobile electronic communication device.

Subsequently, when the A-mode search key box object 108a is moved by the operator and a distance between the A-mode search key box object 108a and the group object 102a falls within a certain distance as illustrated in FIG. 22A, the state of the group object 102a is changed to the adsorption mode. When the state of the group object 102a is changed to the adsorption mode, the retrieval unit 60 calculates a relevance ratio of each of the item objects contained in the group object 102a to the search criteria as the results of logical operations performed on the key objects contained in the A-mode search key box object 108a. In the present embodiment, the item object is an image file, the A-mode search key box object 108a contains the three key objects such as the key object "Person A", the key object "Alone", and the key object "320×240", and the AND operation is set as the logical operation therein. Therefore, the retrieval unit 60 calculates a relevance ratio (which is also the matching rate in this case) on the basis of the determination as to whether the image file is the one having a size of 320×240 in which the person of "Person A" is photographed alone. As for the level of the relevance ratio, in the case of image file capable of determining that the someone is photographed perfectly alone, the relevance ratio becomes 100%, while in the case of image file capable of determining that the image is not clear or that some other person is photographed small, the relevance ratio becomes low. In addition, whether something is photographed in an image can be automatically analyzed by using image analysis software and a face recognition system. After the calculation of the relevance ratio of each of the item objects, the retrieval unit 60 calculates a range of the relevance ratio of an item object to be adsorbed based on the distance between the A-mode search key box object 108a and the group object 102a. The retrieval unit 60 extracts item objects whose relevance ratio is included in the range of the relevance ratio from among the item objects in the group object 102a based on the result of calculation, moves the extracted item objects 104a to the side of the A-mode search key box object 108a, as illustrated in FIG. 22A, and causes them to be adsorbed to the A-mode search key box object 108a.

As for the key object "320×240", it may be determined whether the image size is 320×240 with out using idea of the relevance ratio. When the A-mode search key box object 108a contains a key object for which the idea of the relevance ratio is not used, search may be performed, in respect of that key object, based on determination whether its criteria match or not without considering the distance between the item object contained in the group object 102a and the A-mode search key box object 108a.

Figure 22B:
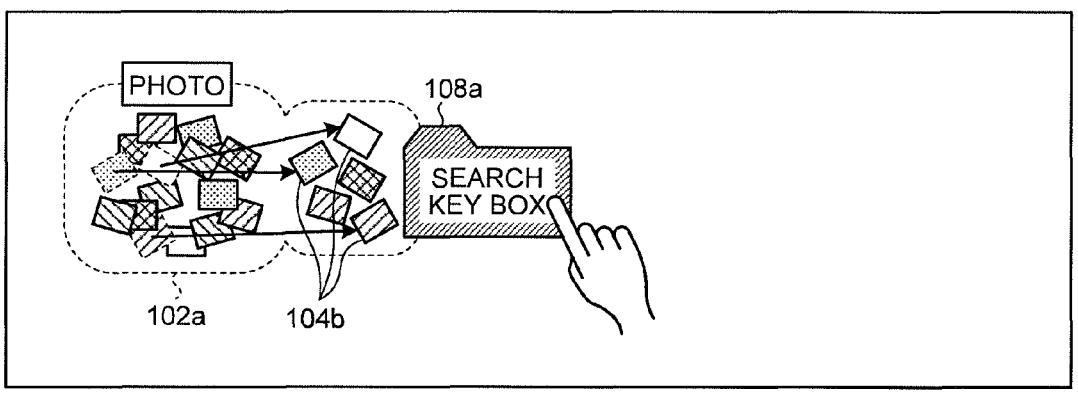
FIG. 22B is an explanatory diagram for explaining the operation of the mobile electronic communication device.

When the A-mode search key box object 108a is further moved from the position illustrated in FIG. 22A to the side of the group object 102a and the distance between the A-mode search key box object 108a and the group object 102a thereby becomes smaller (shorter), the retrieval unit 60 calculates a wider range of the relevance ratio of item objects to be adsorbed, and also extracts the item objects with lower relevance ratio. This causes more item objects 104b as the target item objects to be adsorbed to the search key box object 108a as illustrated in FIG. 22B.

Subsequently, when the operator takes his/her hand off the input device 34 and releases the drag state, which is the untouched state of the input device 34, the item objects to be extracted (adsorbed) are fixed by the retrieval unit 60. That is, the range of the relevance ratio of extracted item objects is fixed, and the item objects that satisfy the range of the relevance ratio are extracted. A group of the extracted item objects is set as a new group object 102b.

Figure 22C:
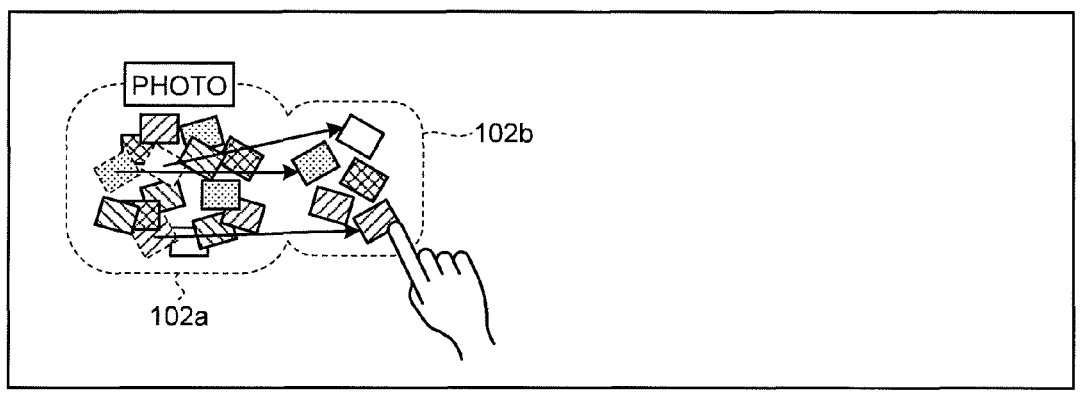
FIG. 22C is an explanatory diagram for explaining the operation of the mobile electronic communication device.
Figure 22D:
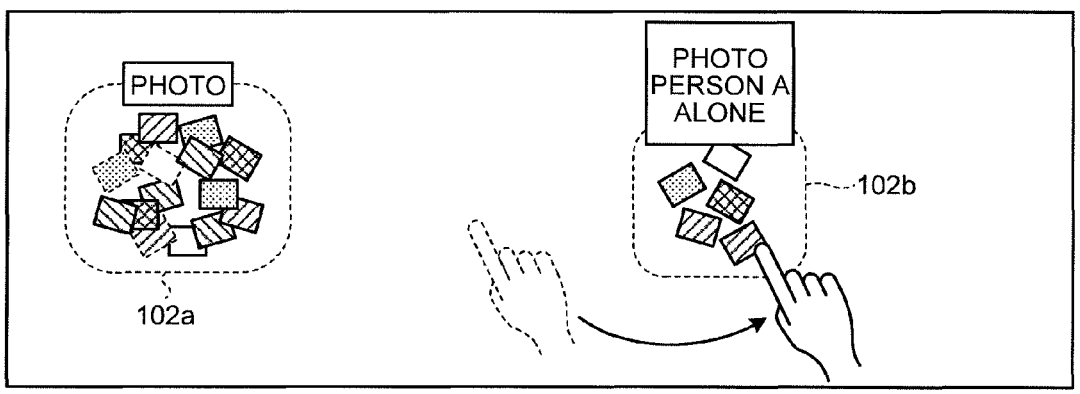
FIG. 22D is an explanatory diagram for explaining the operation of the mobile electronic communication device.

Subsequently, as illustrated in FIG. 22C, when the operator touches the group of the extracted item objects and separates the group of the extracted item objects from the original group object 102a, the group is separately displayed as the new group object 102b as illustrated in FIG. 22D. At this time, the new group object 102b is named by adding the names of the key objects contained in the search key box object 108a to the name of the original group object 102a. That is, the search criteria used for the extraction are displayed as the name of the group object 102b. This enables the attribute of the group object to be easily recognized.

Here, the case where the A-mode search key box object 108a is operated has been explained. However, if the A-mode key object (see FIG. 15) is operated, similarly to the embodiment, the range of a relevance ratio is determined according to the distance between A-mode key object and the group object 102a, and item objects that satisfy the range of the relevance ratio are extracted from the group object 102a.

Figure 23A:
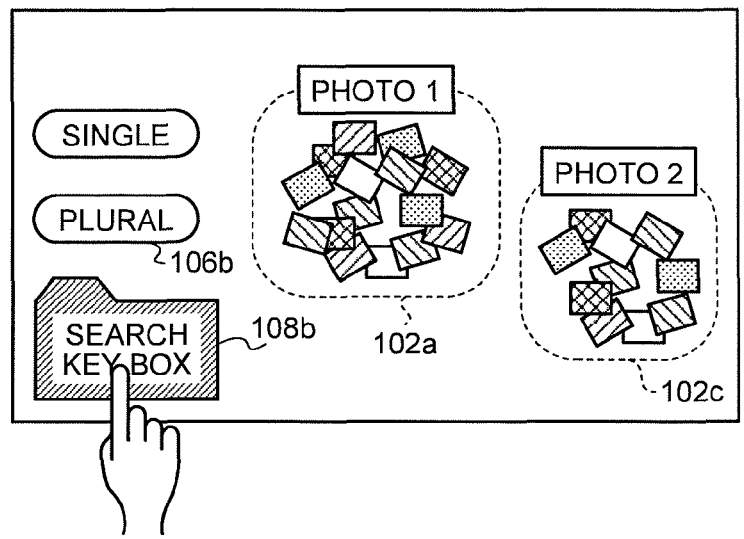
FIG. 23A is an explanatory diagram for explaining an operation of the mobile electronic communication device.
Figure 23B:
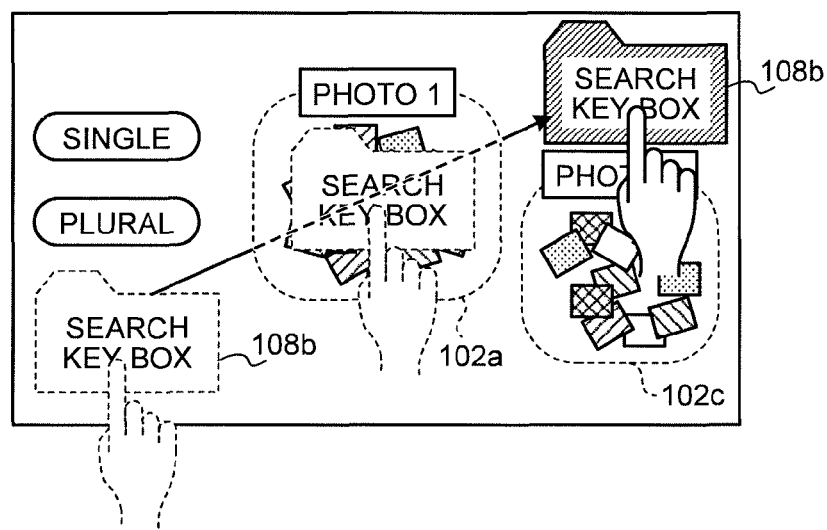
FIG. 23B is an explanatory diagram for explaining the operation of the mobile electronic communication device.
Figure 23C:
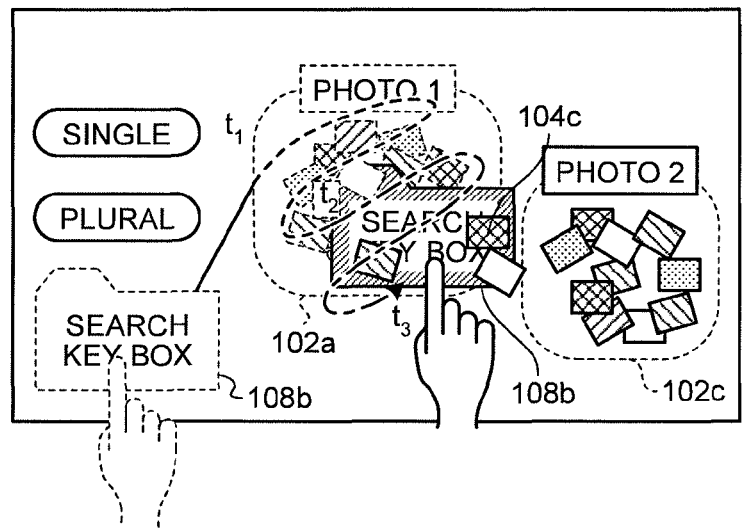
FIG. 23C is an explanatory diagram for explaining the operation of the mobile electronic communication device.

Next, one of the specific operation examples will be explained below with reference to FIG. 23A to FIG. 23C. FIG. 23A to FIG. 23C are explanatory diagrams for explaining operations of the mobile electronic communication device when each of the operations is performed in the object adsorption B mode. FIG. 23A to FIG. 23C represent group objects and B-mode objects related to a target for operation and omit parts of the group objects and key objects respectively. Moreover, it is assumed that two key objects such as the key object "Person A" and key object "Plural" are contained in the B-mode search key box object and the AND operation is set as the logical operation.

First, as illustrated in FIG. 23A, when the area corresponding to one of B-mode objects, that is, a B-mode search key box object 108b in the present embodiment is touched by the operator, the retrieval unit 60 determines that the B-mode search key box object 108b has been selected, and switches to the object adsorption B mode.

Subsequently, the B-mode search key box object 108b is moved by the operator. At this time, if the B-mode search key box object 108b passes through the group object 102a in a short time, the state of the group object 102a is not changed to the adsorption mode. Therefore, the search refinement is not performed, and the item objects are not adsorbed to the B-mode search key box object 108b as illustrated in FIG. 23B. In this way, by setting so that the state is not moved to the adsorption mode when B-mode search key box object passes through the group object only in a short time, even if it is desired to perform the search refinement on the group object 102c using the B-mode search key box object 108b, the B-mode search key box object 108b does not need to be moved so as to go around the area of the group object 102a.

When the B-mode search key box object 108b is operated by the operator to be moved across the area of the group object 102a for a certain time or more and at a certain speed or higher, the state of the group object 102a is changed to the adsorption mode. With this feature, the retrieval unit 60 calculates a relevance ratio of each of the item objects contained in the group object 102a to the search criteria of the B-mode search key box object 108b. In the present embodiment, the item object is an image file, two key objects such as the key object 106 "Person A" and the key object "Plural" are contained in the B-mode search key box object 108b, and the AND operation is set as the logical operation. Therefore, the retrieval unit 60 calculates a relevance ratio (also a matching rate in this case) on the basis of the determination as to whether the image file is the one where a plurality of persons are photographed. As for the level of the relevance ratio, in the case of image file capable of determining that a plurality of persons are clearly photographed, the relevance ratio becomes 100%, while in the case of image file capable of determining that the image is not clear or that a plurality of subjects that look like persons are photographed or something like that, the relevance ratio becomes low. After the calculation of the relevance ratio of each of the item objects, the retrieval unit 60 calculates an acquirable relevance ratio (that is, a range of the relevance ratio) based on the movement distance and/or the moving speed of the B-mode search key box object 108b, extracts item objects whose relevance ratio is included in the range of the relevance ratio from among the item objects in the group object 102a, moves the extracted item objects 104c to the side of the B-mode search key box object 108b as illustrated in FIG. 23C, and causes them to be adsorbed to the B-mode search key box object 108b.

Here, the case where the B-mode search key box object 108b is operated has been explained, however, when the B-mode key object (see FIG. 15) is operated, similarly to the embodiment, the range of a relevance ratio of an item object to be extracted is calculated based on the positional relationship between the group object and the B-mode key object, and item objects that satisfy the range of the relevance ratio are extracted. When the B-mode search key box object 108b is operated, the processes the same as the processes illustrated in FIG. 9 to FIG. 12 are preferably performed. That is, the range of the relevance ratio may be set according to the moving speed of the B-mode search key box object 108b, and the range of the relevance ratio may be set according to a click.

As explained above, the mobile electronic communication device 10 causes a desired key object to be contained in a search key box object capable of containing a plurality of key objects and sets a desired logical operation, which enables the operator to intuitively and visually perform search refinement using the results of logical operations performed on the key objects as search criteria, thus easily obtaining operator's desired search result.

Check of the key objects contained in the search key box object (see FIG. 21B), addition of the key objects to the search key box object (see FIG. 17A to FIG. 17D), deletion of the key objects from the search key box object (see FIG. 21C), and change of the logical operation set in the search key box object (see FIG. 19A to FIG. 19D) can be intuitively performed with a simple operation.

The present embodiment has explained the case where the color of the search key box object is changed according to the logical operation set in the search key box object, however, the present invention is not limited thereto. For example, the shape of the search key box object may be changed according to the logical operation set in the search key box object.

As explained above, the mobile electronic communication device 10 calculates the range of a relevance ratio of item objects to be extracted based on a positional relationship between the group object and the search key box object or the key object, and extracts item objects that satisfy the range of the relevance ratio, which enables the operator to visually recognize the state of the search result. This allows operator's desired search result to be easily obtained. In addition, the level of the relevance ratio can be easily adjusted through the operation of the operator, thus improving operator's operability.

By displaying the extracted item objects adsorbed to the search key box object or to the key object, the number of the extracted item objects can be recognized, thus improving the operability, also in this respect. In the present embodiment, the display of the item objects adsorbed to the search key box object or to the key object represents that the item objects have been extracted, however, the present invention is not limited thereto. It has only to be visually recognized that the item objects have been extracted through the search of the search key box object or of the key object, and therefore the number of extracted item objects may be displayed.

The present embodiment has explained the image file as an example, however, as explained above, the present embodiment can also be used to retrieve a music file, retrieve a home page, and the like. As also explained above, it may be used to retrieve a destination (the other party to be communicated).

For example, when item objects are images representing telephone numbers in the address book data, and if one of the item objects is selected by the user, the CPU 22 executes the process for requiring a phone call with a telephone number corresponding to the selected item object. When item objects are images representing mail addresses in the address book data, and if the user selects one of the item objects, the CPU 22 displays the screen for creating mail to be sent to a mail address corresponding to the selected item object on the display device 32. When item objects are images representing addresses of WEB pages (URL: Uniform Resource Locator), and if the user selects one of the item objects, the CPU 22 makes a connection (a file that the link represents is downloaded and an application program corresponding to the file is executed) to the URL corresponding to the selected item object.

The mobile electronic communication device 10 according to the present embodiment can be also applied to any mobile electronic device that is equipped with a WEB browser capable of displaying a WEB page and displays an image corresponding to a WEB page search result on the display device using the WEB browser. In this case, the item object is an image representing a URL. The group object is an image surrounding a URL group extracted through retrieval. When these images are displayed on the display device and if an area with one item object displayed therein is touched and selected, the mobile electronic communication device 10 acquires a WEB page specified by the URL corresponding to the selected item object through the communication unit, and displays the acquired WEB page on the display device.

The present invention is not limited to the embodiments, and thus can be applied to various embodiments. For example, the embodiments may be used in combination with one another.

INDUSTRIAL APPLICABILITY

As explained above, the communication device and the electronic device according to the present invention are useful to extract an object that matches search criteria from among a plurality of objects.

The invention claimed is:
1. An electronic device comprising:
a display device for displaying an image on a screen;
an input device for detecting an input instruction input by touching an area where the image is displayed on the screen by the display device; and
a controller for providing control based on the input instruction detected by the input device and for providing control for an image to be displayed on the display device,
wherein,
when a first group object containing a plurality of item objects is displayed on the screen by the display device, and when the input device detects an input of a predetermined instruction to refine the first group object, the controller is configured to
extract a group of item objects that match a refinement criterion in the input instruction to refine the first group object, and
display the extracted group as a second group object on the screen of the display device,
the refinement criterion is data which corresponds to at least one of a keyword, a numerical value, or a category, when the first group object and a key object being criteria for refining the item objects from the first group object are displayed on the screen by the display device, and when the input device detects a touch on the key object and a movement of the key object in a touched state,
the controller is configured to calculate a relevance ratio of each of the item objects in the first group object to the key object,
the controller is configured to calculate a range of the relevance ratio to extract the group of item objects, and
when the key object is selected and the group of item objects is extracted based on the range of the relevance ratio at the time of the selection, and when the input device detects at least one tap on the key object, the controller is configured to make the range of the relevance ratio of the item object to be extracted narrower than that before the tap occurs, wherein the controller is configured to
pre-set an amount of the relevance ratio to be changed in response to one tap on the key object,
determine a change amount of the relevance ratio in response to a number of taps on the key object, based on (i) the preset amount and the (ii) number of taps, and
change the range of the relevance ratio to be narrower when the input device detects a larger number of taps.

2. The electronic device according to claim 1, wherein, when the first group object, the key object, and a key box object for containing a plurality of the key objects are displayed on the screen by the display device, and when the input device detects a touch on the key box object and a movement of the key object in a touched state, the controller is configured to
determine a result of a logical operation performed on the key object contained in the key box object,
calculate the relevance ratio of each of the item objects in the first group object in response to the result of the logical operation,
extract an item object that satisfies a range of the calculated relevance ratio from the item objects in the first group object, and
display the extracted item object on the screen of the display device.

3. The electronic device according to claim 2, wherein, when the input device detects a predetermined first input operation to the key box object, the controller is configured to cause a setting of the logical operation to be changed from a currently set operation expression to any other operation expression.

4. The electronic device according to claim 2, wherein, when the input device detects a predetermined second input operation to the key box object, the controller is configured to
cause the display device to display the key objects contained in the key box object on the screen, and
delete, when it is detected that any one of the displayed key objects is selected, the displayed key object that is selected.

5. The electronic device according to claim 2, wherein, when the key object is displayed on the screen by the display device, and when the input device detects movement of the key object into a display area of the key box object, the controller is configured to add the key object into the key box object.

6. The electronic device according to claim 2, wherein the controller is configured to cause the input device to detect a movement amount of the key box object, and
calculate the range of the relevance ratio based on the movement amount of the key box object.

7. The electronic device according to claim 1, wherein the controller is configured to cause the display device to display the item objects contained in the first group object, and to display the extracted item objects near the key object.

8. The electronic device according to claim 1, wherein the controller is configured to
fluctuate the range of the relevance ratio to be calculated according to a distance between the key object and the first group object, and
extract an item object including an item object with a lower relevance ratio as the distance is smaller, and
wherein the controller is configured to extract only an item object with a higher relevance ratio as the distance is larger.

9. The electronic device according to claim 1, wherein the controller is configured to
calculate the range of the relevance ratio according to a movement distance of the key object within a display area of the first group object, and
extract an item object including an item object with a lower relevance ratio as the movement distance is longer, and
wherein the controller extracts only an item object with a higher relevance ratio as the movement distance is shorter.

10. The electronic device according to claim 1, wherein the controller is configured to make the range of the relevance ratio narrower with a longer tapping time.

11. The electronic device according to claim 1, wherein the controller is configured not to extract the item object in a period from entering of the key object into a display area of the first group object to an elapse of a preset time.

12. An electronic device comprising:
a storage device configured to store files, each of the files corresponding to at least one criterion of a keyword, a numerical value, and a category;
a controller configured to manage the files by a first directory;
a display device configured to display first file-images of the files and a first folder-image of the first directory on a screen, the first folder-image containing the first file-images; and
an input device configured to detect a touch onto the screen,
wherein:
the controller is configured to display a key object-image on the screen;
the key object-image corresponds to a refinement criterion corresponding to the criterion;
the input device is configured to detect a touch onto the key object-image of the screen; and
the controller is configured to
calculate a relevance ratio of each of the files when the key object-image is touched and moved, the relevance ratio being calculated based on comparing the criterion with the refinement criterion,
extract a part of the files that satisfy a predetermined range of the relevance ratio from the files,
start to display a second folder-image of a second directory on the screen when the input device detects that the touch has left the key object-image, the second folder-image containing second file-images of the extracted file,
manage the extracted files by the second directory, the second directory being the alternative of the first directory, and
calculate a range of the relevance ratio to extract the files,
when the key object-image is selected and the files are extracted based on the predetermined range of the relevance ratio at the time of the selection, and when the input device detects a tap on the key object-image, the controller is configured to make the predetermined range of the relevance ratio of the files to be extracted narrower than that before the tap occurs, and
the controller is configured to
pre-set an amount of the relevance ratio to be changed in response to one tap on the key object-image,
determine a change amount of the relevance ratio in response to a number of taps on the key object-image, based on (i) the preset amount and the (ii) the number of taps, and
change the range of the relevance ratio to be narrower when the input device detects a larger number of taps.

13. The electronic device according to claim 12, wherein the input device is configured to detect a movement of the touch onto the key object-image, and
the controller is configured to:
calculate a distance of the movement and a speed of the movement,
change the predetermined range based on the distance or the speed, and
thereafter, calculate a relevance ratio to be reduced, from the movement distance or the speed, and
reduce the relevance ratio to an acquirable relevance ratio.

14. The electronic device according to claim 1, wherein the item object is represented by an image file, and a thumbnail image of the image file is displayed as the item object,
the key object is a text string, and
the key object is displayed at a location physically separated from the first group object.

15. The electronic device according to claim 12, wherein the key object-image is a text string, and the key object-image is displayed at a location physically separated from the first folder-image.

16. The electronic device according to claim 1, wherein the controller is configured to calculate the relevance ratio based on at least one of a degree of match with the keyword, a degree of match with the criteria, a number of browsing times, and popularity.

17. The electronic device according to claim 12, wherein the controller is configured to calculate the relevance ratio based on at least one of a degree of match with the keyword, a degree of match with the criteria, a number of browsing times, and popularity.

* * * * *